(12) United States Patent
Okada et al.

(10) Patent No.: US 7,479,262 B2
(45) Date of Patent: Jan. 20, 2009

(54) METHOD FOR SEPARATING PLATINUM GROUP ELEMENT

(75) Inventors: Satoshi Okada, Kagawa-gun (JP); Takahiro Uno, Saitama (JP); Kazusuke Sato, Saitama (JP); Shoji Ishiwata, Saitama (JP)

(73) Assignee: Mitsubishi Materials Corporation, Tokyo (JP)

( * ) Notice: Subject to any disclaimer, the term of this patent is extended or adjusted under 35 U.S.C. 154(b) by 858 days.

(21) Appl. No.: 10/506,613

(22) PCT Filed: Mar. 14, 2003

(86) PCT No.: PCT/JP03/03108

§ 371 (c)(1),
(2), (4) Date: Sep. 13, 2004

(87) PCT Pub. No.: WO03/078670

PCT Pub. Date: Sep. 25, 2003

(65) Prior Publication Data

US 2005/0255017 A1 Nov. 17, 2005

(30) Foreign Application Priority Data

| Mar. 15, 2002 | (JP) | ............................. 2002-072848 |
| Jul. 5, 2002 | (JP) | ............................. 2002-196802 |
| Nov. 29, 2002 | (JP) | ............................. 2002-347546 |
| Jan. 14, 2003 | (JP) | ............................. 2003-006391 |
| Jan. 14, 2003 | (JP) | ............................. 2003-006392 |

(51) Int. Cl.
C22B 11/00 (2006.01)

(52) U.S. Cl. .................. 423/22; 423/508; 423/509; 423/510; 205/580; 75/744

(58) Field of Classification Search .................. 423/22; 423/508–510; 205/580; 75/744
See application file for complete search history.

(56) References Cited

U.S. PATENT DOCUMENTS

| 2,048,563 A | * | 7/1936 | Poland .......................... 423/510 |
| 2,948,591 A | * | 8/1960 | Handwerk et al. ............. 75/753 |
| 2,981,595 A | * | 4/1961 | Tuwiner ....................... 423/508 |
| 3,291,597 A | * | 12/1966 | Mellgren et al. ............... 75/418 |
| 3,997,337 A | * | 12/1976 | Pittie et al. ..................... 423/22 |
| 4,229,270 A | | 10/1980 | Subramanian et al. |
| 4,358,430 A | | 11/1982 | Victorovich et al. |
| 4,390,366 A | | 6/1983 | Lea et al. |
| 4,397,689 A | | 8/1983 | Lea et al. |
| 4,536,383 A | | 8/1985 | Kaufmann et al. |
| 4,615,731 A | | 10/1986 | Thomas et al. |

FOREIGN PATENT DOCUMENTS

| JP | 56-3631 | 1/1981 |
| JP | 56-5306 | 1/1981 |
| JP | 56-84428 | 7/1981 |
| JP | 57-79135 | 5/1982 |
| JP | 58-197233 | 11/1983 |
| JP | 60-176908 | 9/1985 |
| JP | 60-208433 | 10/1985 |
| JP | 2-97626 | 4/1990 |
| JP | 2-221392 | 9/1990 |
| JP | 5-125461 | 5/1993 |
| JP | 5-311258 | 11/1993 |
| JP | 5-311264 | 11/1993 |
| JP | 2000-169116 | 6/2000 |
| JP | 2000-239753 | 9/2000 |
| JP | 2001-11547 | 1/2001 |
| JP | 2001-207223 | 7/2001 |
| JP | 2001-316735 | 11/2001 |
| JP | 2003-268457 | 9/2003 |
| WO | WO 03/078670 A1 | 9/2003 |

OTHER PUBLICATIONS

"Wet type process for copper slime", Journal of the Mining and Materials Processing Institute of Japan, vol. 116, No. 6, 2000, p. 484.

* cited by examiner

*Primary Examiner*—Steven Bos
(74) *Attorney, Agent, or Firm*—Oblon, Spivak, McClelland, Maier & Neustadt, P.C.

(57) ABSTRACT

One object of the present invention is to provide a separation process that enables the efficient separation of selenium, tellurium, and platinum group elements from a material containing selenium/tellurium and platinum group elements. In order to achieve this object, the invention provides a separation process for platinum group elements comprising: a step (A) for treating a material containing selenium/tellurium and platinum group elements with alkali, a step (B) for leaching selenium/tellurium, and a step (C) for separating the platinum group element-containing leaching residue and the selenium/tellurium leachate.

27 Claims, 10 Drawing Sheets

METHOD FOR SEPARATING PLATINUM GROUP ELEMENT

TECHNICAL FIELD

The present invention relates to a treatment process that enables the efficient separation of selenium, tellurium, and platinum group elements from a material containing selenium/tellurium and platinum group elements. Furthermore, the present invention also relates to a separation process that enables the efficient precipitation and separation of residual gold from a platinum group element-containing solution obtained by treatment of the material containing selenium/tellurium and platinum group elements. A separation process of the present invention is ideal for a process for separating and recovering selenium, tellurium, and platinum group elements from the reduction precipitate obtained by reduction treatment of a post-gold extraction liquid in a process for recovering noble metals from a copper electrolysis slime.

In the present invention, a selenium/tellurium mixture refers to a mixture of selenium and tellurium, and describes, for example, the precipitate produced by neutralizing the filtrate obtained by filtering the residue containing platinum group elements from a post-gold extraction liquid generated from a decoppered slime. Furthermore, a material containing selenium/tellurium and platinum group elements refers to a material that contains at least one of selenium and tellurium, together with platinum group elements, and the term selenium/tellurium means selenium and/or tellurium.

BACKGROUND ART

In the copper electrolysis process conducted during copper smelting, impurities that are insoluble in the electrolyte are also generated as a residual by-product. This by-product contains significant quantities of platinum group elements such as Pt, Rh, Ir and Ru, as well as selenium, tellurium, gold, silver and copper. Many processes have already been proposed for separating and recovering these metals. For example, platinum group elements are recovered from the silver anode slime produced during a silver refining step, and from the slime generated by adding nitric acid to this slime, leaching out the metal components other than gold, and then reducing the residue. Conventionally, in order to dissolve these slimes, dissolution in aqua regia, dissolution in hydrochloric acid and hydrogen peroxide, or dissolution in hydrochloric acid under a stream of chlorine gas is conducted.

However, in the case of a material containing selenium/tellurium and platinum group elements, in which selenium and/or tellurium coexist with the platinum group elements, if reduction is used to generate a precipitate, then the platinum group elements form compounds with the selenium/tellurium, which are then very difficult to dissolve in aqua regia, or hydrochloric acid and hydrogen peroxide, meaning separation and recovery becomes impossible. Hydrogen peroxide decomposes on the surface of selenides, and is consequently effectively unable to function as an oxidizing agent. Furthermore, a process for roasting these compounds to effect a vapor state separation of selenium oxide and tellurium oxide has also been proposed, although the toxicity of these materials leads to significant environmental problems.

A process for separating platinum group elements and selenium/tellurium contained in a post-gold extraction liquid generated from a copper electrolysis slime, in which the chlorine ion concentration in the liquid is maintained at no more than 1.5 mol/L, while sulfur dioxide gas with a concentration of 8 to 12% is bubbled through the liquid at a temperature of 60 to 90° C., thus reducing and precipitating the platinum group elements (Japanese Unexamined Patent Application, First Publication No. 2001-316735), and a process for obtaining the extraction residue produced by solvent extraction of gold and platinum group elements from the hydrochloric acid leachate obtained from a copper electrolysis slime, and then introducing sulfur dioxide to the post-extraction liquid to reduce and precipitate the selenium/tellurium (Japanese Patent No. 3,087,758, and Japanese Unexamined Patent Application, First Publication No. 2001-207223) are already known.

However, in these processes, because a large number of parameters must be controlled during the selenium reduction, such as the hydrochloric acid concentration, the temperature, the sulfur dioxide gas concentration, and the sulfur dioxide gas flow rate, control of the process is difficult, leading to a reduction in the recovery rates for the platinum group elements and selenium/tellurium. In addition, managing the steps in the two-stage reduction treatment using sulfur dioxide is extremely difficult, and some incorporation of selenium/tellurium or platinum group elements in the precipitates is unavoidable, meaning separation that relies solely on sulfur dioxide reduction is unsatisfactory. Furthermore, separating platinum group elements and selenium/tellurium using solvent extraction is an expensive process, and the recovery treatment required following the extraction is both complex and time-consuming.

A process in which, instead of using treatment with hydrochloric acid and sulfur dioxide, the copper electrolysis slime is subjected to a leaching treatment in a sulfuric acidic solution under pressurized oxygen-enriched gas (Japanese Unexamined Patent Application, First Publication No. Hei 5-311258), and a process in which, following leaching of the copper electrolysis slime in a sulfuric acidic solution under pressurized oxygen-enriched gas, the leachate is desilvered by treatment with chlorine ions and a sodium thiosulfate solution, and copper is then added (Japanese Unexamined Patent Application, First Publication No. Hei 5-311264) have also been proposed. However, these types of processes that use copper under conditions of pressurized, oxygen-enriched gas are difficult to manage and very costly, and are consequently impractical.

Other known processes include a process in which an oxidizing agent is used to oxidize metallic selenium, and the resulting product is then neutralized with an alkali metal carbonate or hydroxide, thus forming an alkali metal selenate (Japanese Unexamined Patent Application, First Publication No. Sho 60-176908), a process in which a selenium-containing material is reacted with an alkali metal carbonate to generate an aqueous slurry, and this slurry is then baked in an oxidizing atmosphere to produce pellets, which are then subjected to water leaching (Japanese Unexamined Patent Application, First Publication No. Sho 56-5306), a process in which a tellurium-containing slime is dissolved in a mineral acid in the presence of an oxidizing agent, an alkali is then added to the solution to precipitate and separate the copper, and the remaining solution is then neutralized to precipitate out the tellurium (Japanese Unexamined Patent Application, First Publication No. Sho 56-84428), and a process in which a raw material such as a copper electrolysis slime is treated with a strong acid such as hydrochloric acid, and also with an oxidizing agent such as chlorine if the raw material includes compounds, and butyl carbitol is then used as the solvent for extracting tellurium (Japanese Unexamined Patent Application, First Publication No. 2000-239753). However, all of these processes have a large number of steps, and the recovery rates for selenium/tellurium are also low.

The present invention solves the above problems associated with the conventional technology, and has an object of providing a separation process which enables selenium/tellurium and platinum group elements to be easily and efficiently separated from a material containing selenium/tellurium and platinum group elements.

Furthermore, as described above, when a separation process that relies on vaporization by roasting is applied to selenium, a large proportion of the selenium becomes hexavalent, which places a large load on the subsequent waste water treatment.

Accordingly, the present invention provides a process for dissolving a material that contains both platinum group elements and selenium, which is capable of resolving the above problems associated with conventional processes, by providing a dissolution separation process that enables efficient leaching of selenium, thus enabling separation from platinum group elements.

In addition, as described above, managing the steps in a two-stage reduction treatment using sulfur dioxide is extremely difficult, and some incorporation of selenium or platinum group elements in the precipitates is unavoidable, meaning separation that relies solely on sulfur dioxide reduction is unsatisfactory. Furthermore, processes in which platinum group elements are removed by solvent extraction, and subsequently separated from selenium and/or tellurium are expensive, and the recovery treatment required following the extraction is time-consuming. Moreover, each of these processes describes the separation of platinum group elements and selenium that already coexist within a solution, and do not relate to the dissolution of a process precipitate that contains platinum group elements and selenium and the like.

Each of the selenium and tellurium recovery processes described above is a process in which the selenium and/or tellurium is oxidized and solubilized, but none of these processes enables the separation of platinum group elements from selenium at the dissolving stage.

Furthermore, in the recovery of rhodium, which is one of the platinum group elements, rhodium is very susceptible to oxidation, forming a very insoluble rhodium oxide, and is consequently very difficult to dissolve. A process for separating rhodium from a precipitate that contains noble metals, in which the noble metal-containing precipitate is heated with a carbon based reducing agent, and the resulting reduction product is reacted with a sulfating agent, thus forming a rhodium sulfate is known (Japanese Unexamined Patent Application, First Publication No. Hei 5-125461), although this process suffers from low yields and the requirement for a high treatment temperature.

The present invention provides a solution treatment process for a material that contains both platinum group elements and selenium, which is capable of resolving the above problems associated with conventional processes, by providing a treatment process in which selenium is dissolved selectively and separated efficiently from platinum group elements, and the platinum group elements remaining in the solid fraction are then dissolved and recovered.

In addition to the processes described above, known tellurium recovery processes include a process in which an anode slime produced during the electrolytic refining of copper or nickel is subjected to a wet treatment to separate the insoluble silver compounds, which are subsequently leached with ammonia or the like to separate the silver, while the resulting residue that contains tellurium is leached with sodium carbonate (Japanese Unexamined Patent Application, First Publication No. 2001-11547), and a process in which the tellurium-containing filtrate generated during the solvent extraction of gold is reduced to precipitate the selenium, and the remaining filtrate is then returned to sulfuric acid pressurized leaching conditions for leaching into the decoppered leachate (Establishment of copper precipitate wet treatment technology, Journal of the Mining and Materials Processing Institute of Japan, Vol. 1116, p. 484, 2000). However, processes for recovering tellurium from insoluble silver compounds suffer from poor tellurium migration rates. Furthermore, in processes in which the tellurium-containing filtrate is returned to pressurized leaching, the leaching rate is unsatisfactory if the tellurium is in metal form, causing an undesirable increase in the holdup volume in the process.

The present invention resolves these problems associated with the conventional treatment processes, by providing a treatment process in which a mixture of selenium and tellurium is alloyed with copper, this alloy is subjected to copper electrolysis to recover electrolytic copper and generate a selenium and tellurium slime, and leaching of this copper electrolysis slime is then used to leach out the tellurium and separate the selenium, thus enabling the selenium and tellurium to be processed with good efficiency.

As described above, in the copper electrolysis process of a copper smelting process, impurities that are insoluble in the electrolyte are generated as a residual by-product. This by-product contains significant quantities of gold, silver, copper, platinum group elements such as Pt, Rh and Ru, as well as Se and Te. Many processes have already been proposed for separating and recovering these noble metals. For example, a decoppered slime can be subjected to chlorination leaching, with silver and lead being recovered from the resulting residue, and gold being recovered from the leachate by a solvent extraction process. The residual liquid following this gold extraction contains platinum group elements, as well as Se and Te. This post-gold extraction liquid is then subjected to a reduction treatment by introducing sulfur dioxide gas into the system, the initial selenium precipitate that first is subjected to distillation to recover high purity selenium, and the resulting distillation residue is subjected to alkali melt treatment to effect a separation into a selenium-containing leachate and a platinum group element-containing residue, whereas the tellurium that is precipitated by continuing the introduction of sulfur dioxide gas into the above residual liquid is subjected to alkali leaching treatment to effect a separation into a selenium/tellurium-containing leachate and a platinum group element-containing residue, and selenium and tellurium, and the platinum group elements are then recovered from this leachate and residue respectively.

In this type of noble metal recovery system, the gold recovery process has conventionally employed a known solvent extraction process that uses dibutyl carbitol (DBC) (Japanese Unexamined Patent Application, First Publication No. Sho 57-79135). A process in which an aqueous solution of oxalic acid is added to the extracted solution to reduce and precipitate the gold is also known (Japanese Unexamined Patent Application, First Publication No. 2001-316735). However, solvent extraction processes that use DBC typically leave approximately 0.3% of the solvent in the post-extraction liquid. This residual solvent can be separated by distillation, but the small quantity of gold contained in the solvent remains, and a process for efficiently removing this gold during the subsequent steps is much sought after.

Furthermore, a process in which oxalic acid is added to the chlorination leachate from a copper electrolysis slime, and the resulting precipitate is treated with nitric acid and melted by heating (Japanese Examined Patent Application, Second Publication No. Sho 64-3930), and a process in which bis(2-butoxyethyl)ether is mixed with the chlorination leachate from a copper electrolysis slime, the gold is extracted into the organic phase by adding ether, this organic phase is scrubbed with hydrochloric acid, and then oxalic acid is added to reduce gold (Japanese Patent No. 3,087,758) are also known. However, processes in which gold is selectively reduced using oxalic acid suffer from extremely slow reaction rates in those cases where the chloride ion concentration of the chlorination leachate from the copper electrolysis slime is high, making the gold reduction step practically impossible.

On the other hand, a process that uses hydroxylamine hydrochloride, nitrous acid, or sulfurous acid as the reducing agent for extracting gold from gold-containing materials is also known (Japanese Unexamined Patent Application, First Publication No. Hei 2-97626). Furthermore, a process in which an alkylhydroxylamine is used as a complexing agent during the electroplating of palladium and gold and the like has also been disclosed (Japanese Unexamined Patent Application, First Publication No. Hei 2-221392). However, the quantity of gold remaining within the post-gold extraction liquid generated from a decoppered slime is minimal, and the quantities of selenium, tellurium, and platinum group elements are higher, and consequently even if hydroxylamine hydrochloride or an alkylhydroxylamine is added directly to this post-gold extraction liquid, an efficient recovery of gold is impossible.

The present invention seeks to overcome the above problems associated with conventional processes for recovering gold from a material containing selenium/tellurium and platinum group elements generated by treatment of the chlorination leachate from a copper electrolysis slime, by providing a process that enables the efficient separation and recovery of gold contained within such a material containing selenium/tellurium and platinum group elements.

DISCLOSURE OF INVENTION

In order to achieve the above objectives, the present invention provides a separation process for platinum group elements comprising: a step (A) for treating a material containing selenium/tellurium and platinum group elements with alkali, a step (B) for leaching selenium/tellurium, and a step (C) for separating the platinum group element-containing leaching residue and the selenium/tellurium leachate.

In the above separation process, the step (A) for treating a material containing selenium/tellurium and platinum group elements with alkali is preferably an alkali melt process, wherein a flux comprising a mixture of caustic soda and sodium nitrate is added to the material containing selenium/tellurium and platinum group elements, and the mixture is melted by heating to a temperature exceeding the eutectic temperature of the flux, the step (B) for leaching selenium/tellurium is preferably a water leaching step for leaching the obtained melt with water, and the step (C) for separating the platinum group element-containing leaching residue and the selenium/tellurium leachate is preferably a step for conducting a solid-liquid separation using water leaching, thus separating the mixture into a liquid fraction containing sodium selenite, and a residue containing platinum group elements.

In the above separation process, the molar ratio between the caustic soda and the sodium nitrate is preferably within a range from 75:25 to 85:15.

In the above separation process, hydrogen peroxide and hydrochloric acid are preferably added to the residue containing platinum group elements to dissolve the platinum group elements.

In the above separation process, the material containing selenium/tellurium and platinum group elements is preferably an extraction residue process precipitate left after a solvent extraction has been used to separate gold from the hydrochloric acid leachate from a decoppered slime.

In the above separation process, the aforementioned material containing selenium/tellurium and platinum group elements is preferably a distillation residue produced by converting a decoppered slime to a slurry by adding hydrochloric acid and hydrogen peroxide, filtering this slurry to separate leaching residue containing primarily silver, and a leachate containing gold, platinum group elements, selenium and tellurium, subsequently adjusting the liquid characteristics of the leachate and using a solvent extraction to extract gold from the leachate, adding sulfur dioxide to the post-extraction liquid to sequentially reduce and precipitate out selenium and then tellurium, and then heating the precipitated material containing platinum group elements and selenium to concentrate the platinum group elements, while distilling and separating off selenium.

In the above separation process, the step (A) for treating a material containing selenium/tellurium and platinum group elements with alkali, and the step (B) for leaching selenium/tellurium are preferably conducted simultaneously as an alkali leaching process, wherein the material containing selenium/tellurium and platinum group elements is leached with alkali at high temperature, causing the selenium/tellurium to migrate into the liquid, and a solid-liquid separation is then conducted to separate the mixture into a solid fraction containing platinum group elements, and a liquid fraction containing selenium/tellurium.

In the above separation process, an oxidizing agent is preferably added to the separated solid fraction generated in the solid-liquid separation under acidic conditions using hydrochloric acid, thus dissolving the platinum group elements.

In the above separation process, the material containing selenium/tellurium and platinum group elements is preferably leached with alkali at high temperature, causing the tellurium to migrate into the liquid with the selenium, thus effecting a separation from the platinum group elements.

In the above separation process, the material containing selenium/tellurium and platinum group elements is preferably leached using an alkali which concentration is at least 1 mol/L, at a temperature of at least 60° C.

In the above separation process, hydrochloric acid and either hydrogen peroxide or chlorine gas are preferably added to the solid fraction from the solid-liquid separation performed after the alkali leaching, thus dissolving the platinum group elements.

In the above separation process, the platinum group elements preferably comprise one or more of rhodium, ruthenium, palladium and platinum.

In the above separation process, the material containing selenium/tellurium and platinum group elements is preferably an extraction residue process precipitate left after a solvent extraction has been used to separate gold from the hydrochloric acid leachate from a decoppered slime.

In the above separation process, the aforementioned material containing selenium/tellurium and platinum group elements is preferably a filtered precipitate produced by converting a decoppered slime to a slurry by adding hydrochloric acid and hydrogen peroxide, filtering this slurry to effect a separation into a residue containing primarily silver, and a leachate containing gold, platinum group elements, selenium and tellurium, subsequently adjusting the liquid characteristics of the leachate and using a solvent extraction to separate gold from the leachate, adding sulfur dioxide to the post-extraction liquid to precipitate either selenium or tellurium, and then subjecting this precipitate to solid-liquid separation.

The above separation process preferably comprises:

an alkali melt process (i), comprising a step for adding a flux comprising a mixture of caustic soda and sodium nitrate to a residue from a distillation treatment of a material containing selenium/tellurium and platinum group elements, and then heating to a temperature exceeding the melting (eutectic) temperature of the mixture, thus dissolving the selenium/tellurium as the aforementioned step (A) for conducting the alkali treatment, a step for conducting water leaching as the aforementioned step (B) for leaching selenium/tellurium, and further comprising the aforementioned step (C) for separating the platinum group element-containing leaching residue and the selenium/tellurium leachate, and an alkali leaching process (ii), comprising a step for leaching a material containing selenium/tellurium and platinum group elements with alkali at high temperature as the aforementioned step (A) for conducting the alkali treatment and the aforementioned step (B) for leaching selenium/tellurium, and further comprising the aforementioned step (C) for separating the platinum group element-containing leaching residue and the selenium/tellurium leachate.

In the above separation process, a solution containing selenium/tellurium and platinum group elements is preferably subjected to a reduction treatment, and the residue generated by subjecting a portion of the resulting reduction precipitate to distillation treatment is then subjected to alkali melt treatment, while the residual reduction precipitate is subjected to alkali leaching treatment.

In the above separation process, sulfur dioxide gas is introduced into a post-gold extraction liquid of a noble metal recovery system for a copper electrolysis slime to effect a reduction treatment, and the residue generated by subjecting the selenium that precipitates first to distillation to effect a separation of high purity selenium is preferably subjected to alkali melt treatment, whereas the tellurium that precipitates next is preferably subjected to alkali leaching treatment.

In the above separation process described above, the leachate obtained in the water leaching of the alkali melt process is preferably recycled to the alkali leaching process, and subjected to alkali leaching together with the material containing selenium/tellurium and platinum group elements.

In the above separation process, the leachate obtained in the alkali leaching process is preferably neutralized by adding sulfuric acid or hydrochloric acid, thus precipitating selenium/tellurium.

In the above separation process, hydrochloric acid is preferably added to the leaching residue generated in the alkali leaching process and the alkali melt process in the presence of an oxidizing agent, thus dissolving the platinum group elements.

In the above separation process, a selenium/tellurium mixture is preferably obtained from the aforementioned selenium/tellurium leachate, and the obtained selenium/tellurium mixture is then introduced into a copper smelting and refining process to generate an alloy of selenium and tellurium with copper, this alloy is subjected to copper electrolysis to recover electrolytic copper, while accumulating selenium and tellurium within the copper electrolysis slime, and this copper electrolysis slime is then subjected to sulfuric acid oxidizing leaching, thus dissolving and separating the tellurium from the selenium which remains in the leaching residue.

In the above separation process, a selenium/tellurium mixture is preferably obtained by adding sulfuric acid or hydrochloric acid to the selenium/tellurium leachate obtained in the aforementioned alkali leaching process, thus neutralizing the leachate and precipitating the selenium/tellurium mixture, and the obtained selenium/tellurium mixture is then introduced into a copper refining process to generate an alloy of selenium and tellurium with copper, this alloy is subjected to copper electrolysis to recover electrolytic copper, while accumulating selenium and tellurium within the copper electrolysis slime, and this copper electrolysis slime is then subjected to sulfuric acid oxidizing leaching, thus dissolving and separating the tellurium from the selenium which remains in the leaching residue.

In the above separation process, a selenium/tellurium mixture is preferably obtained by adding the selenium/tellurium leachate obtained in the aforementioned alkali melt process to the material containing selenium/tellurium and platinum group elements used in the aforementioned alkali leaching process, conducting alkali leaching, and then adding sulfuric acid or hydrochloric acid to the resulting leachate to neutralize the leachate and precipitate the selenium/tellurium mixture, and the obtained selenium/tellurium mixture is then introduced into a copper smelting and refining process to generate an alloy of selenium and tellurium with copper, this alloy is subjected to copper electrolysis to recover electrolytic copper, while accumulating selenium and tellurium within the copper electrolysis slime, and this copper electrolysis slime is then subjected to sulfuric acid oxidizing leaching, thus dissolving and separating the tellurium from the selenium, which remains in the leaching residue.

In the above separation process, the material containing selenium/tellurium and platinum group elements is preferably a reduction precipitate produced by introducing sulfur dioxide gas into a post-gold extraction liquid and conducting a reduction treatment.

In the above separation process, following leaching of tellurium by sulfuric acid oxidizing leaching of the copper electrolysis slime, the leachate is preferably contacted with metallic copper and the resulting copper telluride is recovered.

In the above separation process, hydrochloric acid is preferably added to the obtained residue containing platinum group elements in the presence of an oxidizing agent, a solid-liquid separation is conducted, and hydroxylamine hydrochloride is then added to the filtered platinum group element-containing solution to selectively reduce and precipitate the gold.

In the above separation process, alkali treatment of the material containing selenium/tellurium and platinum group elements is preferably conducted at high temperature.

In the above separation process, hydrochloric acid is preferably added to the obtained residue containing platinum group elements in the presence of an oxidizing agent, a solid-liquid separation is conducted, and hydroxylamine hydrochloride is then added to the filtered platinum group element-containing solution to selectively reduce and precipitate the gold.

In the above separation process, the post-gold extraction liquid of a noble metal recovery system for copper electrolysis slime is preferably used as the material containing selenium/tellurium and platinum group elements, and sulfur dioxide gas is introduced into this post-extraction liquid to effect a reduction treatment, and the distillation residue generated by subjecting the selenium that precipitates first to distillation to effect a separation of high purity selenium is subjected to alkali melt treatment to separate a residue containing platinum group elements, whereas the tellurium that precipitates on further sulfur dioxide gas introduction into the post-extraction liquid is subjected to alkali leaching treatment to separate a residue containing platinum group elements, and these residues containing platinum group elements are then combined and used.

BEST MODE FOR CARRYING OUT THE INVENTION

As follows is a more detailed description of a separation process of the present invention.

Figure 1:
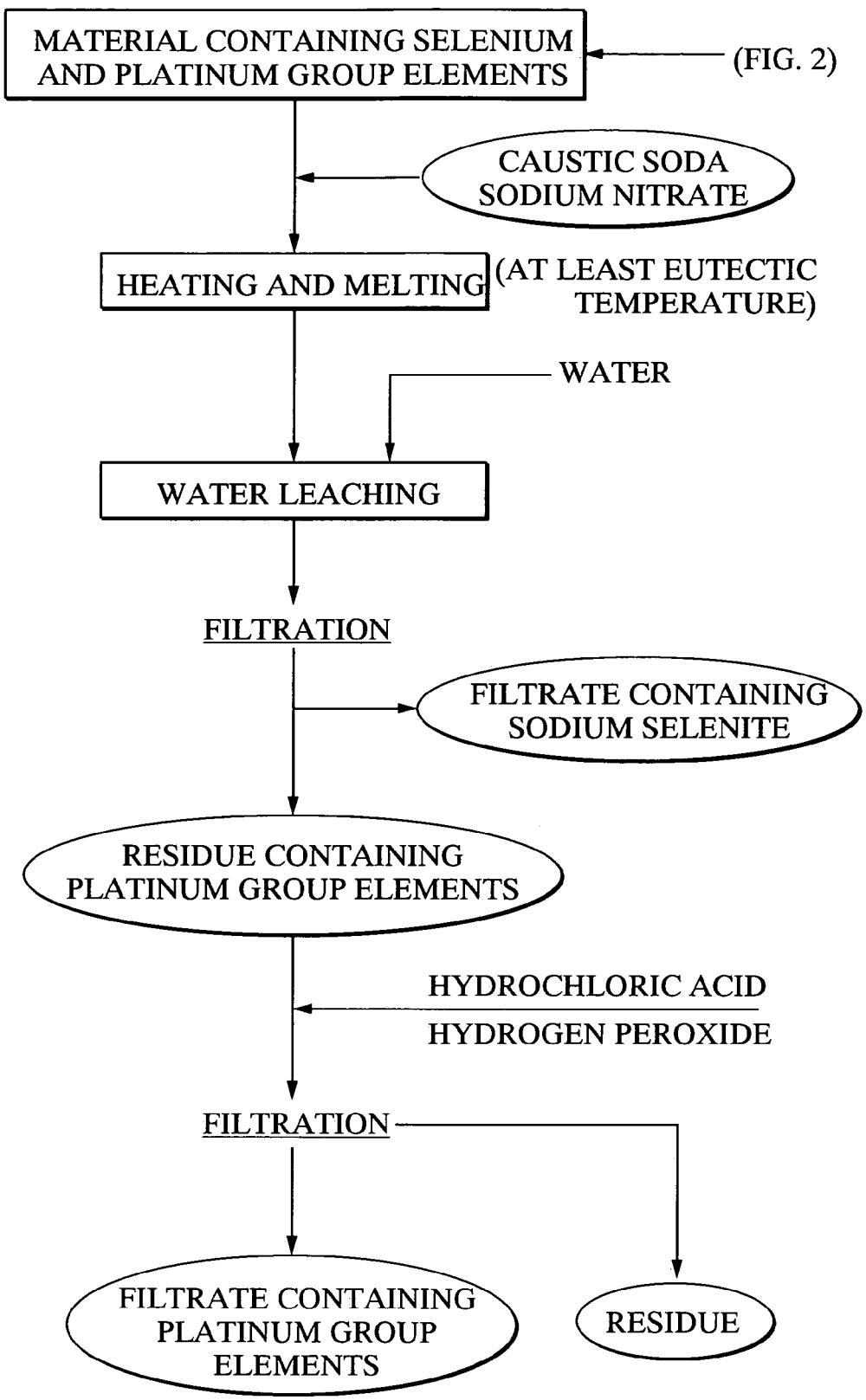
FIG. 1 is a process drawing showing an outline of a solution separation process of the present invention, showing the steps for separating both selenium/tellurium and platinum group elements from a material containing selenium/tellurium and platinum group elements.

A first separation process of the present invention is described using FIG. 1. As shown in the figure, the first separation process of the present invention is a solution treatment process for a material containing selenium and platinum group elements, wherein a flux comprising a mixture of caustic soda and sodium nitrate is added to the material containing selenium and platinum group elements, the mixture is melted by heating to a temperature exceeding the eutectic temperature of the flux, and the resulting melt is leached with water to effect a solid-liquid separation, thus separating the mixture into a liquid fraction containing sodium selenite, and a residue containing platinum group elements.

Figure 2:
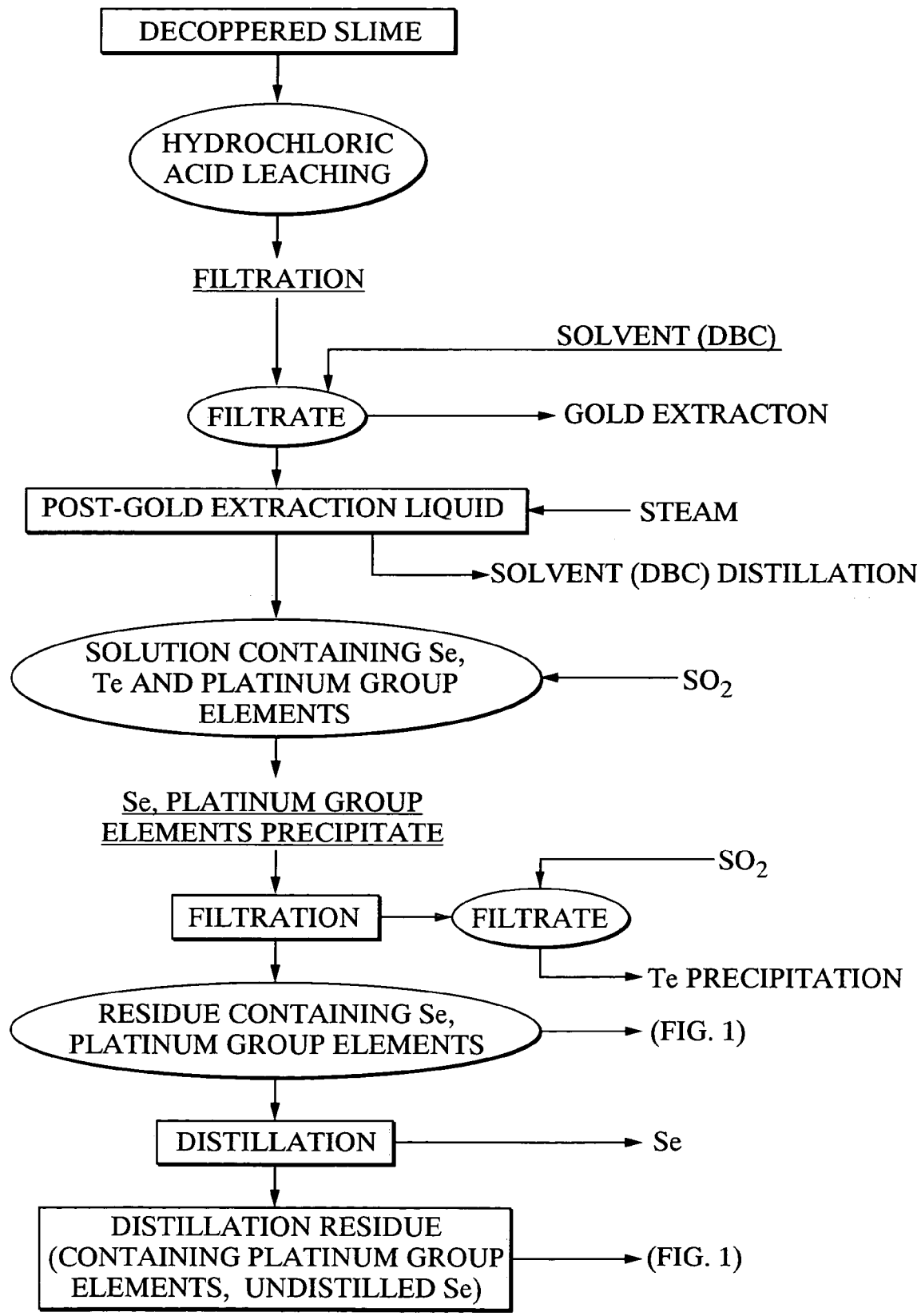
FIG. 2 is a process drawing showing an outline of the steps from treatment of a decoppered slime through to the separation process shown in FIG. 1.

The material containing selenium and platinum group elements can use, for example, the extraction residue generated following solvent extraction of gold from the hydrochloric acid leachate from a decoppered slime. This decoppered slime contains large quantities of valuable metals such as gold, silver, platinum group elements, selenium and tellurium. The treatment process for the slime is shown in FIG. 2. As shown in the figure, the decoppered slime is converted to a slurry by adding hydrochloric acid and hydrogen peroxide, and this slurry is then filtered to separate a leaching residue containing primarily silver from a leachate containing gold, platinum group elements, selenium and tellurium. Following adjustment of the liquid characteristics of the leachate, a solvent extraction is used to extract gold from the leachate. The post-extraction liquid contains the residual platinum group elements, selenium and tellurium. Sulfur dioxide is then added to this post-extraction liquid to sequentially reduce and precipitate out selenium and then tellurium. Tellurium has a lower reduction potential than selenium, and tellurium precipitates out after the precipitation of selenium, and thereby tellurium and selenium can be separated with each other. Due to this reduction, platinum group elements are precipitated together with selenium, and the precipitate containing platinum group elements and selenium can be heated to concentrate the platinum group elements and distill off the selenium. The residue following distillation and separation of selenium contains platinum group elements and undistilled selenium.

Materials containing selenium and platinum group elements, such as the above distillation residue, are combined with a flux comprising a mixture of caustic soda (NaOH) and sodium nitrate ($NaNO_3$), and the resulting mixture is melted by heating to a temperature exceeding the eutectic temperature of the flux. This heating and melting converts the selenium to a mainly tetravalent state, generating sodium selenite ($Na_2SeO_3$) which subsequently dissolves. The reason for using a mixture of caustic soda and sodium nitrate as the flux is that if only caustic soda is used, then supply of oxygen from the atmosphere is inadequate, leading to the production of sodium selenide ($Na_2Se$), and this sodium selenide converts to metallic selenium and precipitates during water leaching, meaning the platinum group elements and selenium cannot be physically separated. Furthermore, if only sodium nitrate is used as the flux, then the oxidizing power becomes overly strong, leading to an increase in the proportion of undesirable hexavalent selenium.

In order to enable a reduction in the melting temperature, the composition of the flux is preferably close to a eutectic composition. Specifically, the ratio of caustic soda: sodium nitrate is preferably within a range from 75:25 to 85:15 (molar ratio). Furthermore, the heating temperature must be at least the eutectic temperature of the flux (258° C.), and because the flux must have an adequate fluidity and be capable of leaching the selenide materials, a temperature within a range from 350 to 450° C. is preferred. At temperatures within this range, the sodium nitrate ($NaNO_3$) generates oxygen but is less likely to generate NOx, whereas if the temperature exceeds the above range, the proportion of NOx generation increases, and the oxidizing power also strengthens, increasing the proportion of hexavalent selenium.

Following addition of the above flux to the material containing selenium and platinum group elements, and subsequent heating to melt the flux, the melted product is leached with water to effect a solid-liquid separation. Sodium selenite dissolves in water, whereas the platinum group elements remain in the residue, and consequently by conducting water leaching of the above melt and then filtering, the mixture can be separated into a filtrate containing sodium selenite and a solid residue containing platinum group elements. The filtrate contains essentially no platinum group elements, indicating an effective separation of selenium from the platinum group elements. The platinum group elements contained within the solid residue are leached by adding an oxidizing agent such as hydrogen peroxide, together with hydrochloric acid. The resulting mixture is then filtered to enable the recovery of a filtrate containing the platinum group elements.

Accordingly, according to a first separation process of the present invention, the type of platinum group element selenide material that is essentially insoluble in conventional industrial wet processes, can be almost completely dissolved, and the production of hexavalent selenium, which remains a problem in dry processes, can be suppressed to low levels. Furthermore, only water is required for dissolving the selenium and leaching it from the melt, meaning the treatment costs can be reduced.

Figure 3:
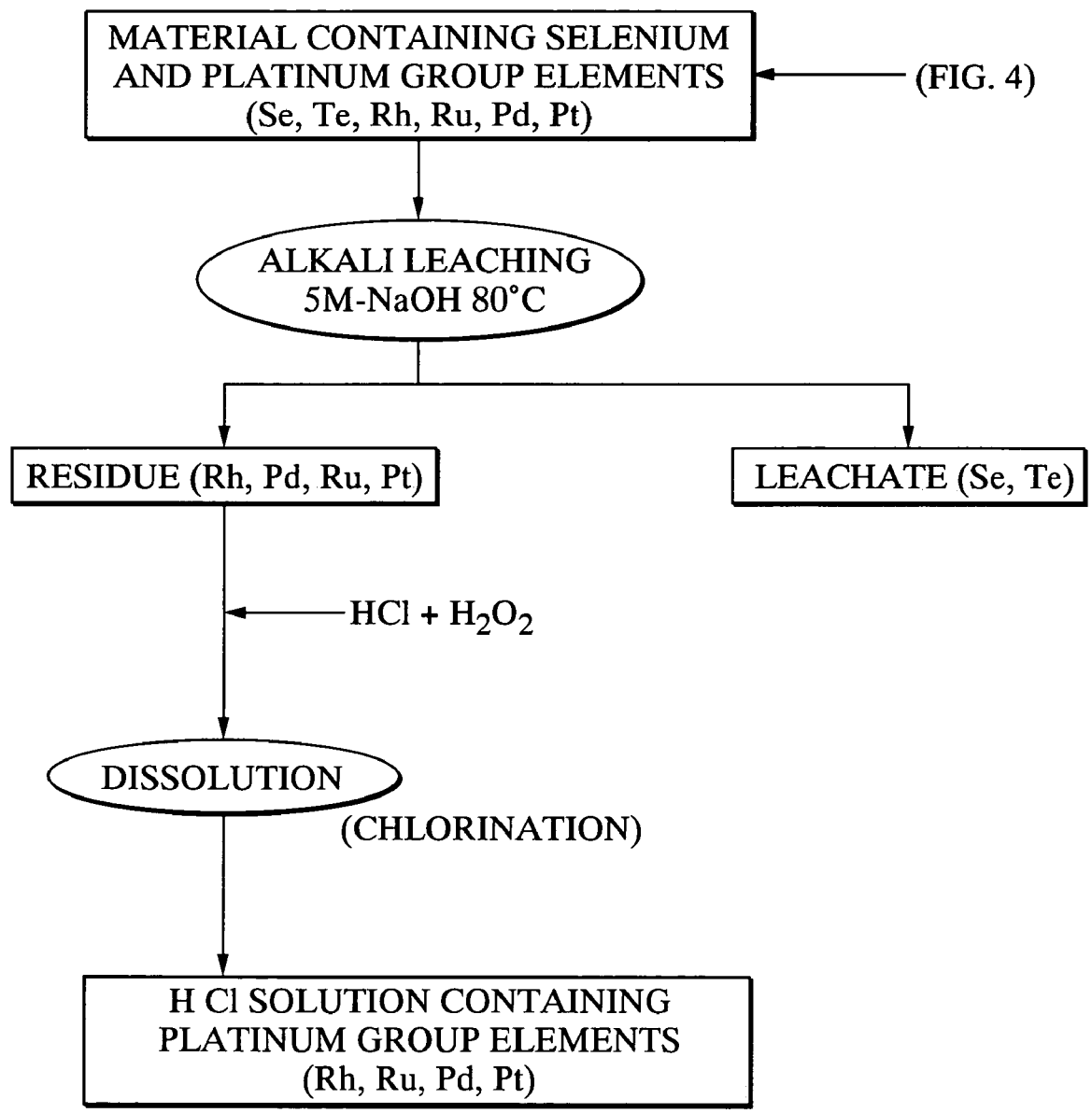
FIG. 3 is a process drawing showing an outline of a separation process of the present invention, showing other steps for separating both selenium/tellurium and platinum group elements from a material containing selenium/tellurium and platinum group elements.

As follows is a description of a second preferred separation process of the present invention, using FIG. 3. As shown in FIG. 3, this second separation process of the present invention is a separation process in which the material containing selenium and platinum group elements is leached with alkali at high temperature, causing the selenium and the like to migrate into the liquid, and a solid-liquid separation is then conducted to separate the mixture into a solid fraction containing platinum group elements and a liquid fraction containing selenium and the like.

Another form of the second separation process of the present invention further comprises a platinum group element dissolution and separation process, wherein hydrochloric acid and an oxidizing agent are added to the separated solid fraction generated by alkali leaching, thus dissolving the platinum group elements. Furthermore, the second separation process also includes a process wherein the high temperature alkali leaching causes the migration of both selenium and tellurium into the liquid phase, thus effecting a separation from the platinum group elements, and a process wherein the platinum group elements comprise one or more of rhodium, ruthenium, palladium and platinum. In the present invention, a material containing selenium and platinum group elements refers to a material that contains platinum group elements such as rhodium, together with selenium and the like. Furthermore, the expression "selenium and the like" means selenium and/or tellurium.

Figure 4:
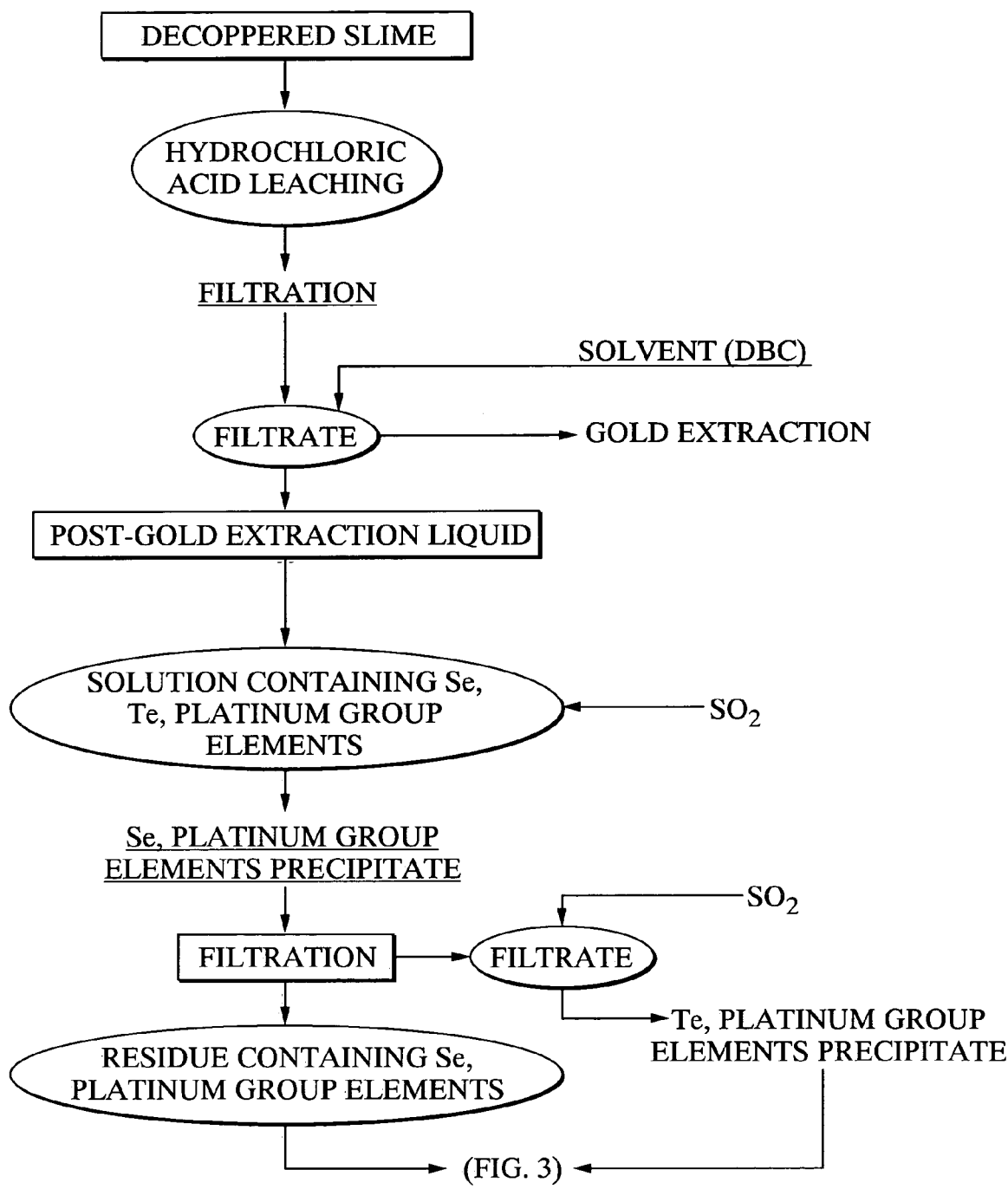
FIG. 4 is a process drawing showing an outline of the steps from treatment of a decoppered slime through to the separation process shown in FIG. 3.

As described above, the material containing selenium and platinum group elements can use, for example, the process precipitate of an extraction residue generated following solvent extraction of gold from the hydrochloric acid leachate from a decoppered slime. This decoppered slime contains large quantities of valuable metals such as gold, silver, platinum group elements, selenium and tellurium. The treatment process for the slime is shown in FIG. 4. As shown in the figure, the decoppered slime is converted to a slurry by adding hydrochloric acid and hydrogen peroxide, and this slurry is then filtered to effect a separation into a residue containing primarily silver, and a leachate containing gold, platinum group elements, selenium and tellurium. Following adjustment of the liquid characteristics of the leachate, a solvent extraction is used to extract gold from the leachate. The post-extraction liquid contains the residual platinum group elements, selenium and tellurium. Sulfur dioxide is then added to this post-extraction liquid to precipitate out the platinum group elements, selenium, and tellurium, which are recovered as a process precipitate.

During the reduction and precipitation of selenium and tellurium from the above post-extraction liquid by addition of sulfur dioxide, because tellurium has a lower reduction potential than selenium, the tellurium precipitates out after the precipitation of selenium, and consequently by filtering off the selenium precipitate and then adding more sulfur dioxide to the filtrate to precipitate out the tellurium, the two elements can be separated and recovered. During this reduction process, the platinum group elements precipitate out with both the selenium and the tellurium. The present invention can use the selenium precipitate or the tellurium precipitate as the target material containing selenium/tellurium and platinum group elements.

The alkali leaching of the material containing selenium and platinum group elements is typically conducted under an alkali concentration of at least 1 mol/L, and concentrations within a range from 5 mol/L to 8 mol/L are preferred. By ensuring that the alkali concentration is at least 1 mol/L, a strong alkali environment of at least pH 14 is achieved, which causes a reduction in the oxidation-reduction potential of selenium and tellurium, meaning selenium and tellurium can be dissolved into the alkali solution at normal pressure, without the need to use an oxidizing agent. Because the progress of this selenium and tellurium dissolution reaction is slow at room temperature, the leaching is typically conducted at a temperature of at least 60° C., and preferably at a temperature of approximately 80° C.

The alkali leaching causes the selenium and tellurium to be dissolved into the alkali solution, where they are dispersed in colloid form. In contrast, platinum group elements such as rhodium and palladium are not dissolved and remain in the solid phase. Filtering the resulting mixture enables a separation into a dispersion containing selenium and/or tellurium, and a solid fraction containing the platinum group elements.

Following the above solid-liquid separation, an oxidizing agent such as hydrogen peroxide and hydrochloric acid are added to the filtered solid fraction, thus dissolving the platinum group elements such as platinum, palladium, rhodium and ruthenium. The platinum group elements are oxidized by hydrogen peroxide, and then form chloride complexes with the chlorine ions, enabling them to be stabilized and dissolved in the liquid phase. The hydrogen peroxide is added in the quantity required to convert the platinum group elements into ions with stable oxidation numbers, namely, the quantity required to convert platinum to a tetravalent form, palladium to a bivalent form, and rhodium and ruthenium to trivalent forms. The quantity of hydrochloric acid used is sufficient to generate $PtCl_6^-$, $PdCl_4^-$, $RhCl_6^{3-}$, and $RuCl_6^{3-}$ respectively, as well as leave at least 2 mol/L free hydrochloric acid. The reaction temperature is typically at least 60° C. in order to accelerate the reaction, and is typically no more than 80° C. in order to suppress decomposition of the hydrogen peroxide, and a temperature of approximately 70° C. is preferred. This dissolution treatment enables a hydrochloric acid solution containing dissolved platinum, palladium, rhodium and ruthenium to be obtained.

According to the second separation process of the present invention, by subjecting a material containing selenium and platinum group elements to alkali leaching at a treatment temperature within a range from 60 to 80° C., selenium and tellurium can be dissolved and separated from the platinum group elements at normal pressure, and without the use of an oxidizing agent. Accordingly, selenium and tellurium can be separated easily from a process precipitate containing selenium and tellurium as well as platinum group elements, and the platinum group elements can be selectively recovered with a yield of 95% or higher. Moreover, because the platinum group elements are not oxidized during this alkali leaching, highly insoluble oxides such as rhodium oxide and ruthenium oxide are not produced, meaning the platinum group elements can be subsequently easily dissolved. The platinum group elements in the alkali leaching residue can be subsequently oxidized in the presence of hydrochloric acid, thus forming chloride complexes, and generating a platinum group element solution. The dissolved selenium and tellurium are dispersed in colloid form, and can be precipitated as metals by neutralizing the leachate, and consequently these two metals can also be recovered with ease. Conventional alkali leaching processes that use an oxidizing agent require the leaching to be conducted under pressurized conditions, and because they generate sodium selenate and/or sodium selenite, subsequent recovery of the selenium is time-consuming. In contrast, the treatment process of the present invention enables the dissolution of selenium and tellurium, and enables the separation of these elements from the platinum group elements to be conducted at normal pressure, without the use of an oxidizing agent, meaning process control and the recovery treatment are much easier.

Figure 5:
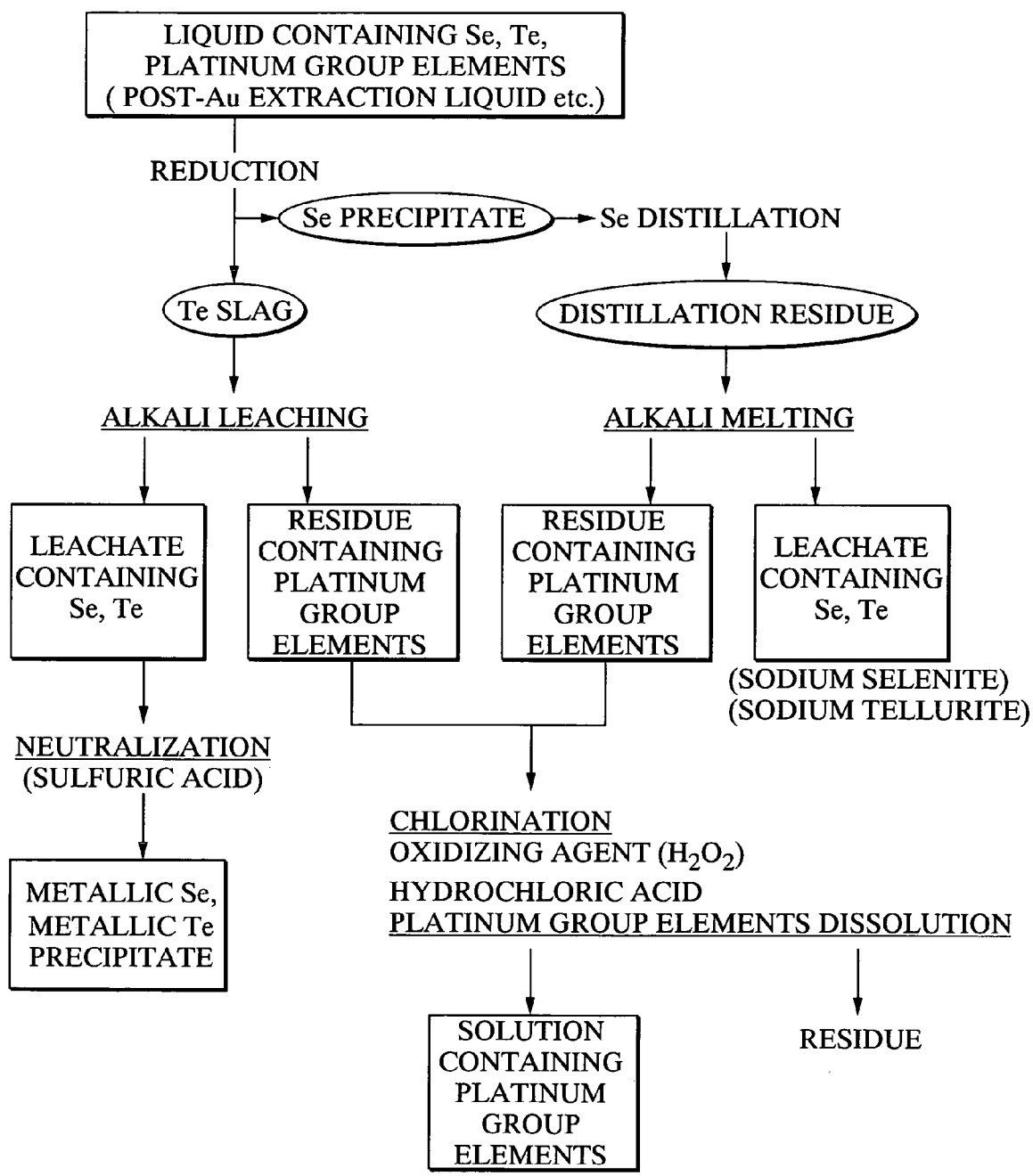
FIG. 5 is a process drawing showing an outline of a separation process of the present invention, showing other steps for separating both selenium/tellurium and platinum group elements from a material containing selenium/tellurium and platinum group elements.

Next is a description of a third preferred separation process of the present invention, using FIG. 5. As shown in the figure, this third separation process of the present invention is a process for separating both selenium and platinum group elements from a material containing selenium/tellurium and platinum group elements, which comprises an alkali leaching process (ii) for subjecting a material containing selenium/tellurium and platinum group elements to alkali treatment at high temperature, thus separating the material into a leachate containing selenium/tellurium and a leaching residue containing platinum group elements, and an alkali melt process (i) for adding a mixture of caustic soda and sodium nitrate to a residue from a distillation treatment of a material containing selenium and platinum group elements, subsequently heating to a temperature exceeding the melting (eutectic) temperature of the mixture, thus dissolving the selenium/tellurium, and then performing water leaching to separate the mixture into a leachate containing selenium/tellurium and a leaching residue containing platinum group elements.

[Material Containing Selenium/Tellurium and Platinum Group Elements]

As described above, the material containing selenium/tellurium and platinum group elements can use, for example, the reduction process precipitate of an extraction residue generated following solvent extraction of gold from the hydrochloric acid leachate from a decoppered slime. This decoppered slime contains large quantities of valuable metals such as gold, silver, platinum group elements, selenium and tellurium. Specifically, the material containing selenium/tellurium and platinum group elements is obtained by treating the decoppered slime in the following manner. First, the decoppered slime is converted to a slurry by adding hydrochloric acid and hydrogen peroxide, and this slurry is then filtered to separate a residue containing primarily silver from a leachate containing gold, platinum group elements, selenium and tellurium. Following adjustment of the liquid characteristics of the leachate, a solvent extraction using DBC or the like is used to extract gold from the leachate. The post-extraction liquid contains the residual platinum group elements, as well as selenium and tellurium. Sulfur dioxide, and more specifically sulfur dioxide gas, is then introduced into this post-extraction liquid in a quantity sufficient to retain the selenium concentration in the liquid at a value of 3 g/L or higher, thus reducing and precipitating the selenium, and effecting a separation from the remaining post-extraction liquid. Further sulfur dioxide is then introduced into the remaining post-extraction liquid from which the selenium has been separated, thus reducing and precipitating out the residual selenium, together with the tellurium, which can be separated by subsequent filtration.

The third separation process of the present invention can use the post-gold extraction liquid described above as a liquid containing selenium/tellurium and platinum group elements. Furthermore, the separation process can use the reduction precipitate from the above post-gold extraction liquid, or the distillation residue generated upon subsequent distillation, as the material containing selenium/tellurium and platinum group elements. In addition, waste water from a plating factory, or other solutions containing selenium/tellurium and platinum group elements such as smelting waste water can also be used as the material containing selenium/tellurium and platinum group liquid.

In the reduction treatment of the above post-gold extraction liquid, when the selenium and the tellurium are reduced and precipitated, because tellurium has a lower reduction potential than selenium, the tellurium precipitates after the precipitation of selenium, and consequently by filtering off the selenium precipitate and then adding more sulfur dioxide to the filtrate to precipitate the tellurium, the two elements can be separated and recovered. During this reduction process, the platinum group elements precipitate together with both the selenium and the tellurium.

The materials containing selenium/tellurium and platinum group elements obtained in this manner are treated in a subsequent alkali leaching process and an alkali melt process. In this case, the selenium that precipitates first on reduction of the extraction residue is preferably subjected to distillation to enable the recovery of high purity selenium, and the residue (distillation residue) is subjected to alkali melt treatment, whereas the tellurium that is precipitated afterwards is preferably subjected to alkali leaching treatment. The distillation residue includes compounds such as palladium selenide, and is stable, and consequently selenium dissolution cannot be achieved by alkali leaching. By subjecting the distillation residue to alkali melt treatment, the selenium can be processed efficiently. In contrast, the rhodium and ruthenium incorporated in the tellurium precipitate is of a relatively higher content than that contained in the selenium precipitate, and consequently if the tellurium precipitate is subjected to alkali melting, it is prone to forming insoluble oxides, making the subsequent hydrochloric acid leaching step difficult. Accordingly, the tellurium precipitate preferably undergoes alkali leaching treatment.

[Alkali Melt Process]

The above material containing selenium/tellurium and platinum group elements, such as the selenium precipitate or the aforementioned selenium distillation residue undergo alkali melt treatment. In this alkali melt treatment, a flux comprising a mixture of caustic soda (NaOH) and sodium nitrate ($NaNO_3$) is added to the selenium precipitate or the selenium distillation residue, and the resulting mixture is melted by heating to a temperature exceeding the melting point (eutectic temperature) of the flux. This heating and melting converts the selenium to a mainly tetravalent state, generating sodium selenite ($Na_2SeO_3$) which subsequently dissolves. The reason for using a mixture of caustic soda and sodium nitrate as the flux is that if only caustic soda is used, then supply of oxygen from the atmosphere is inadequate, leading to the production of sodium selenide ($Na_2Se$), and this sodium selenide converts to metallic selenium and precipitates during water leaching, meaning the platinum group elements and selenium cannot be physically separated. Furthermore, if only sodium nitrate is used as the flux, then the oxidizing power becomes overly strong, leading to an increase in the proportion of undesirable hexavalent selenium.

In order to reduce the melting temperature, the composition of the flux is preferably close to a eutectic composition. Specifically, the ratio of caustic soda: sodium nitrate is preferably within a range from 75:25 to 85:15 (molar ratio). Furthermore, the heating temperature must be at least the eutectic temperature of the flux (258° C.), and because the flux must have an adequate fluidity and be capable of leaching the selenide materials, a heating temperature within a range from 350 to 450° C. is preferred. At temperatures within this range, the sodium nitrate ($NaNO_3$) generates oxygen but is less likely to generate NOx, whereas if the temperature exceeds the above range, the proportion of NOx generation increases, and the oxidizing power also strengthens, increasing the proportion of hexavalent selenium.

Following addition of the above flux to the material containing selenium and platinum group elements and subsequent heating to melt the flux, the melted product is leached with water to effect a solid-liquid separation. Sodium selenite dissolves in water, whereas the platinum group elements remain in the residue, and consequently by conducting water leaching of the above melt and then filtering, the mixture can be separated into a filtrate containing sodium selenite and a solid residue containing platinum group elements. The filtrate contains essentially no platinum group elements, indicating an effective separation of selenium from the platinum group elements. The platinum group elements contained in the solid residue are dissolved by adding hydrochloric acid, together with an oxidizing agent such as hydrogen peroxide. The resulting mixture is then filtered to enable the recovery of a filtrate containing the platinum group elements.

[Alkali Leaching Process]

The material containing selenium/tellurium and platinum group elements undergoes alkali leaching treatment. Alkali leaching is typically conducted under an alkali concentration of at least 1 mol/L, and concentrations within a range from 5 mol/L to 8 mol/L are preferred. By ensuring that the alkali concentration is at least 1 mol/L, a strong alkali environment of at least pH 14 is achieved, which causes a reduction in the oxidation-reduction potential of selenium and tellurium, meaning selenium and tellurium can be dissolved into the alkali solution at normal pressure, without the need to use an oxidizing agent. Because the progress of this selenium and tellurium dissolution reaction is slow at room temperature, the leaching is typically conducted at a temperature of at least 60° C., and preferably at a temperature of approximately 80° C.

The alkali leaching causes the selenium and tellurium to be dissolved into the alkali solution, where they are dispersed in colloid form. In contrast, platinum group elements such as rhodium and palladium are not dissolved and remain in the solid phase. Filtering the resulting mixture enables a separation into a leachate containing selenium and/or tellurium, and a solid fraction containing the platinum group elements.

Following the above solid-liquid separation, if sulfuric acid or hydrochloric acid is added to the filtrate containing selenium/tellurium to effect a neutralization, a black colored precipitate of metallic selenium and/or metallic tellurium develops, and the color of the solution gradually lightens from a deep purple color, until the liquid becomes transparent at around pH 7. The assay of this selenium precipitate and/or tellurium precipitate is typically 99% or better, enabling the recovery of high quality metallic selenium and/or metallic tellurium. If nitric acid is used instead of the sulfuric acid or hydrochloric acid, the oxidizing power of the nitric acid causes the selenium/tellurium to oxidize and dissolve, meaning precipitation is not possible. The liquid temperature is preferably from 60 to 80° C. If neutralization is conducted at a liquid temperature within this range, metallic selenium with good filterability can be obtained.

An oxidizing agent such as hydrogen peroxide, and hydrochloric acid are added to the filtered solid fraction containing the platinum group elements, thus dissolving the platinum group elements such as platinum, palladium, rhodium and ruthenium. The platinum group elements are oxidized by hydrogen peroxide, and then form chloride complexes with the chloride ions, enabling them to be stabilized and dissolved in the liquid phase. The hydrogen peroxide is added in the quantity required to convert the platinum group elements into ions with stable oxidation numbers, namely, the quantity required to convert platinum to a tetravalent form, palladium to a bivalent form, and rhodium and ruthenium to trivalent forms. The quantity of hydrochloric acid used is preferably sufficient to generate $PtCl_6^-$, $PdCl_4^-$, $RhCl_6^{3-}$, and $RuCl_6^{3-}$ respectively, as well as leave at least 2 mol/L free hydrochloric acid. The reaction temperature is typically at least 60° C. in order to accelerate the reaction, and is typically no more than 80° C. in order to suppress decomposition of the hydrogen peroxide, and a temperature of approximately 70° C. is preferred. This dissolution treatment enables a hydrochloric acid solution containing dissolved platinum, palladium, rhodium and ruthenium to be obtained.

As described above, by subjecting a material containing selenium and platinum group elements to alkali leaching at a treatment temperature within a range from 60 to 80° C., selenium and tellurium can be dissolved and separated from the platinum group elements at normal pressure, and without the use of an oxidizing agent. Accordingly, selenium and tellurium can be separated easily from a process precipitate containing selenium and tellurium as well as platinum group elements, and the platinum group elements can be selectively recovered with a yield of 95% or higher. Moreover, because the platinum group elements are not oxidized during this alkali leaching, highly insoluble oxides such as rhodium oxide and ruthenium oxide are not produced, meaning the platinum group elements can be subsequently easily dissolved. The platinum group elements in the leaching residue can be recovered by oxidizing in the presence of hydrochloric acid, thus forming chloride complexes, and generating a platinum group element solution. The dissolved selenium and tellurium are dispersed in colloid form, and can be precipitated as metals by neutralizing the leachate with either sulfuric acid or hydrochloric acid, and consequently these two metals can also be recovered with ease. Conventional alkali leaching processes that use an oxidizing agent require the leaching to be conducted under pressurized conditions, and generate sodium selenate and/or sodium selenite, and the presence of hexavalent selenium means the removal of selenium from waste water is difficult. In contrast, the treatment process of the present invention enables the dissolution of selenium and tellurium, and the separation of these elements from the platinum group elements to be conducted at normal pressure, without the use of an oxidizing agent, meaning process control and the recovery treatment can be completed without the generation of hexavalent selenium.

As described above, in the alkali melt process, the selenium and/or tellurium is dissolved in the water in the form of sodium selenite or sodium tellurite, and is subsequently separated from the leaching residue that contains the platinum group elements. However, the separated water leachate may still contain small residual quantities of platinum group elements in addition to the selenium/tellurium, and consequently the water leachate is preferably recycled into the above alkali leaching process, and subjected to alkali leaching together with the material containing selenium/tellurium and platinum group elements. This recycling treatment concentrates the selenium/tellurium.

On the other hand, the leaching residue containing platinum group elements obtained in the alkali melt process is combined with an oxidizing agent such as hydrogen peroxide together with hydrochloric acid, in the same manner as the residue from the alkali leaching process, thus dissolving the platinum group elements such as platinum, palladium, rhodium and ruthenium. The platinum group elements are oxidized by hydrogen peroxide, and then form chloride complexes with the chlorine ions, enabling them to be stably dissolved in the liquid phase. This dissolution treatment enables a hydrochloric acid solution containing dissolved platinum, palladium, rhodium and ruthenium to be obtained. This chlorination treatment is preferably conducted together with the leaching residue obtained in the alkali leaching process.

According to the third separation process of the present invention, the material containing selenium/tellurium and platinum group elements is treated using a combination of an alkali leaching process, in which alkali leaching is conducted at high temperature, and an alkali melt process, in which a mixture of caustic soda and sodium nitrate is added, and the mixture is melted by heating to a temperature exceeding the melting (eutectic) temperature to dissolve the selenium/tellurium, and as a result, the selenium/tellurium and the platinum group elements can be concentrated and almost entirely recovered, enabling an easily-refined hydrochloric acid solution to be supplied to a subsequent refining step, and enabling platinum group elements and selenium/tellurium to be separated simply, efficiently, and at low cost, from a material containing selenium/tellurium and platinum group elements.

As follows is a description of a fourth preferred separation process of the present invention, using FIG. 6.

The fourth separation process described below is a treatment process for selenium/tellurium in which a selenium/tellurium mixture is introduced into a copper smelting and refining process to generate an alloy of selenium and tellurium with copper, this alloy is subjected to copper electrolysis to recover electrolytic copper, while accumulating selenium and tellurium within the copper electrolysis slime, and this copper electrolysis slime is then subjected to sulfuric acid oxidizing leaching to dissolve the tellurium, thus enabling the tellurium to be separated from the selenium which remains in the leaching residue.

Figure 6:
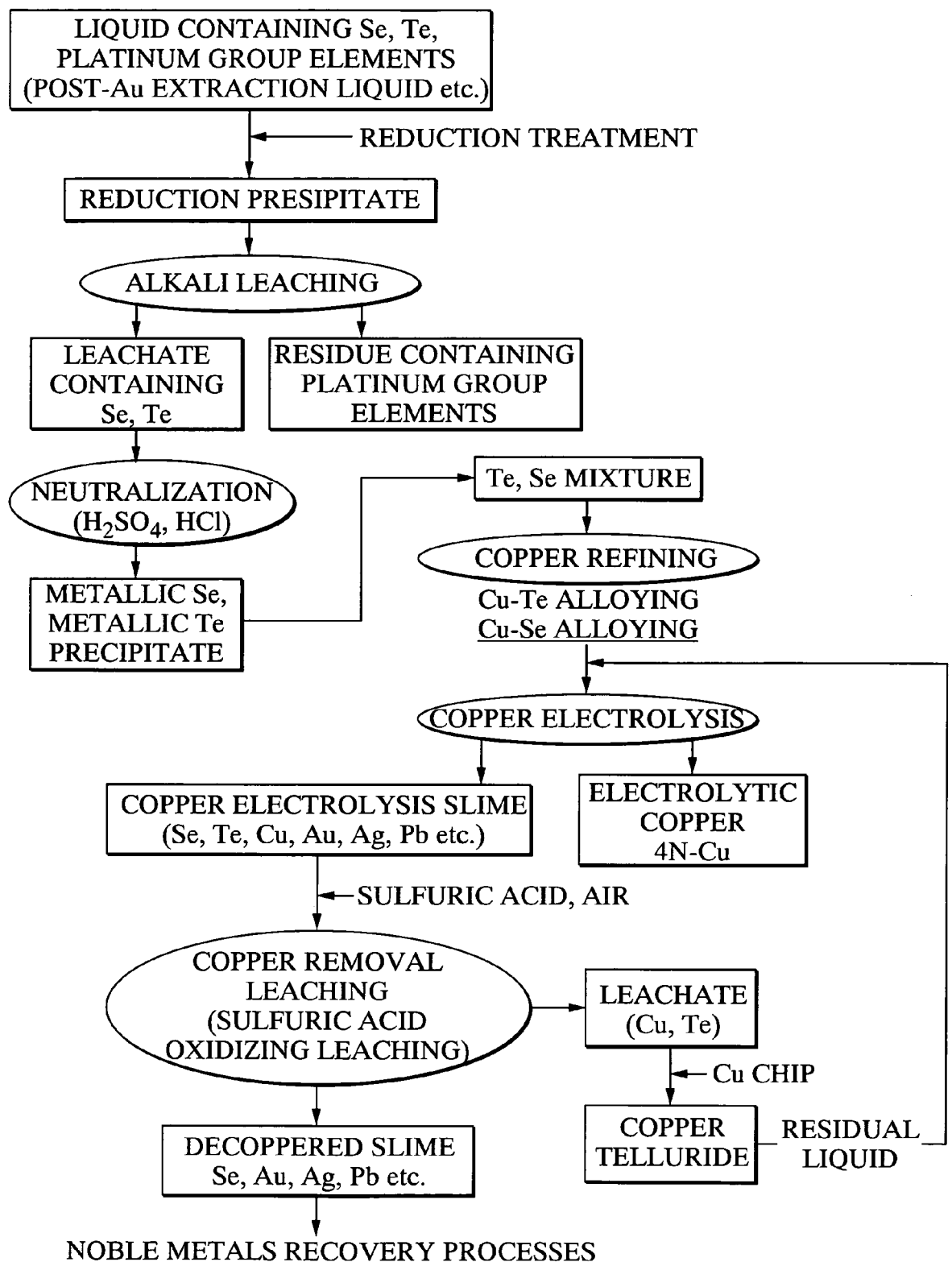
FIG. 6 is a process drawing showing an outline of a separation process of the present invention, showing steps for separating selenium and tellurium from a selenium/tellurium mixture.

More specifically, as shown by the treatment process shown in FIG. 6, an aforementioned material containing selenium/tellurium and platinum group elements is used as the selenium/tellurium mixture, and as described above, this material first passes through the alkali leaching process, in which the mixture is subjected to alkali leaching at high temperature to effect a separation into a leachate containing selenium/tellurium and a leaching residue containing platinum group elements. Sulfuric acid or hydrochloric acid is then added to the leachate to neutralize the leachate and precipitate the selenium/tellurium mixture, and this mixture is introduced into the copper refining process to generate an alloy of selenium and tellurium with copper. This alloy is subjected to copper electrolysis to recover electrolytic copper, while accumulating selenium and tellurium within the copper electrolysis slime, and this copper electrolysis slime is then subjected to sulfuric acid oxidizing leaching to elute the tellurium, thus enabling the tellurium to be separated from the selenium, which remains in the leaching residue.

[Selenium/Tellurium Mixture]

In the fourth separation process of the present invention, the selenium/tellurium mixture can use a treated material containing selenium/tellurium and platinum group elements from a copper process. Specifically, the type of material containing selenium/tellurium and platinum group elements that was used in the first through third separation processes can be used.

This material containing selenium/tellurium and platinum group elements is then treated in the alkali leaching process and alkali melt process described below. As was the case in the above separation processes, in the fourth separation process, the selenium that precipitates first on reduction of the post-extraction liquid is preferably subjected to distillation to enable the recovery of high purity selenium, and the residue (distillation residue) is subjected to alkali melt treatment, whereas the tellurium that is precipitated afterwards is preferably subjected to alkali leaching treatment. The distillation residue includes compounds such as palladium selenide, and is stable, and consequently selenium dissolution cannot be achieved by alkali leaching. By subjecting the distillation residue to alkali melt treatment, the selenium can be processed efficiently. In contrast, the rhodium and ruthenium incorporated in the tellurium precipitate is of a relatively higher content than that contained in the selenium precipitate, and consequently if the tellurium precipitate is subjected to alkali melting, it is prone to forming insoluble oxides, making the subsequent hydrochloric acid leaching step difficult. Accordingly, the tellurium precipitate preferably undergoes alkali leaching treatment.

[Alkali Leaching Process]

As described in the separation process above, the material containing selenium/tellurium and platinum group elements undergoes alkali leaching treatment. Alkali leaching is typically conducted under an alkali concentration of at least 1 mol/L, and concentrations within a range from 5 mol/L to 8 mol/L are preferred. By ensuring that the alkali concentration is at least 1 mol/L, a strong alkali environment of at least pH 14 is achieved, which causes a reduction in the oxidation-reduction potential of selenium and tellurium, meaning selenium and tellurium can be dissolved into the alkali solution at normal pressure, without the need to use an oxidizing agent. Because the progress of this selenium and tellurium dissolution reaction is slow at room temperature, the leaching is typically conducted at a temperature of at least 60° C., and preferably at a temperature of approximately 80° C.

The alkali leaching causes the selenium and tellurium to be dissolved into the alkali solution, where they are dispersed in colloid form. In contrast, platinum group elements such as rhodium and palladium are not dissolved and remain in the solid phase. Filtering the resulting mixture enables a separation into a leachate containing selenium and/or tellurium, and a solid fraction containing the platinum group elements.

The above alkali leaching may also be conducted on a combination of the material containing selenium/tellurium and platinum group elements, and the leachate obtained by subjecting the residue from the aforementioned distillation treatment to alkali melt treatment. The selenium precipitate obtained by reduction treatment of the material containing selenium/tellurium and platinum group elements, or the residue obtained from distillation treatment of this reduced selenium precipitate is combined with a flux comprising a mixture of caustic soda (NaOH) and sodium nitrate ($NaNO_3$), and the resulting mixture is melted by heating to a temperature exceeding the melting point (eutectic temperature) of the flux. This heating and melting converts the selenium to a mainly tetravalent state, generating sodium selenite ($Na_2SeO_3$) which subsequently dissolves. This alkali melt treatment causes the selenium/tellurium to dissolve, and water leaching is then used to separate the mixture into a leachate containing the selenium/tellurium, and a leaching residue containing the platinum group elements. This leachate can be added to the alkali leaching process of materials containing selenium/tellurium and platinum group elements, and subjected to alkali leaching, as described above. Using the leachate obtained from this alkali melt process enables the overall selenium/tellurium recovery rate for the entire treatment process to be improved.

Following the above solid-liquid separation of the alkali leaching, if sulfuric acid or hydrochloric acid is added to the filtrate containing selenium/tellurium to effect a neutralization, a black colored precipitate of metallic selenium and/or metallic tellurium develops, and the color of the solution gradually lightens from a deep purple color, until the liquid becomes transparent at around pH 7. By conducting a solid-liquid separation, a mixture of metallic tellurium and metallic selenium can be recovered. The assay of this selenium/tellurium mixture is typically 99% or better, enabling the recovery of high quality metallic selenium and/or metallic tellurium. If nitric acid is used instead of the sulfuric acid or hydrochloric acid, the oxidizing power of the nitric acid causes the selenium/tellurium to oxidize and dissolve, meaning precipitation is not possible. The liquid temperature is preferably from 60 to 80° C. If neutralization is conducted at a liquid temperature within this range, a selenium/tellurium mixture with good filterability can be obtained.

In the fourth separation process of the present invention, the above selenium/tellurium mixture is introduced into the copper smelting and refining process to generate an alloy of selenium and tellurium with copper, and this alloyed copper (crude copper) then undergoes electrolysis to recover electrolytic copper, while the selenium and tellurium are accumulated within the copper electrolysis slime, together with the other insoluble components. The copper electrolysis can be conducted under normal copper electrolysis conditions. The copper electrolysis yields high purity electrolytic copper, while the selenium and tellurium form a copper electrolysis slime with the other insoluble components that were incorporated within the crude copper. By subjecting this copper electrolysis slime to air oxidation in sulfuric acid and conducting a leaching treatment (copper removal leaching), the majority of the copper and tellurium contained within the slime can be dissolved. Sulfuric acid electrolyte can be used as the sulfuric acid for this step. Bringing the dissolved copper leachate containing tellurium into contact with metallic copper forms copper telluride, meaning the tellurium can be recovered as copper telluride. From an industrial viewpoint, the dissolved copper leachate containing tellurium is preferably passed through a column packed with copper chip to recover the copper telluride. On the other hand, the selenium remains in the leaching residue (decoppered slime), and consequently this copper removal leaching can be used to separate selenium and tellurium.

Following the above copper removal leaching, the leachate containing copper and selenium is retuned to the copper electrolysis step, and the copper is recovered as electrolytic copper. As described above, the selenium accumulates in the copper electrolysis slime, and consequently by repeating the sulfuric acid oxidizing leaching (copper removal leaching) of the copper electrolysis slime, the selenium becomes concentrated within the decoppered slime. Furthermore, this decoppered slime also contains large quantities of noble metals such as gold, silver, platinum group elements, and lead, and consequently by conducting a chlorination leaching of the decoppered slime by introducing an oxidizing agent such as hydrogen peroxide or chlorine gas together with hydrochloric acid or the like, these noble metals can be dissolved, and then recovered by employing treatment processes suited to recovery of each of the noble metal elements.

In one example of a process for recovering a noble metal, the silver and lead contained in the slime are converted to insoluble chlorides through the above chlorination leaching, while the gold, platinum group elements, selenium and tellurium are dissolved in the leachate, a solid-liquid separation is then conducted to effect a separation into a leaching filtrate containing gold and platinum group elements and the like, and a leaching filtered residue containing silver and lead, and the treatment process described above is then used to separate and recover silver and lead from this silver and lead-containing residue. Furthermore, a solvent extraction can be used to extract gold from the leaching filtrate containing tellurium and platinum group elements and the like, and a subsequent reduction then used to recover the gold, while the post-extraction liquid can be subjected to distillation treatment, the selenium and the tellurium reduced, and the resulting reduction precipitate used to repeat the treatment of the present invention, thus enabling the selenium and tellurium to be concentrated, and recovered with a good level of efficiency.

According to the fourth separation process of the present invention, a selenium/tellurium mixture is introduced into a copper refining process to generate an alloy of selenium and tellurium with copper, and this copper alloy is subjected to electrolysis to recover high purity electrolytic copper, while the selenium and tellurium are accumulated in the copper electrolysis slime, and consequently by subjecting this copper electrolysis slime to sulfuric acid oxidizing leaching (copper removal leaching), the tellurium can be dissolved into the solution and separated from the selenium, and the dissolved tellurium can be separated and recovered through contact with metallic copper to generate copper telluride. Furthermore, the selenium that remains in the copper leaching residue can be separated and recovered by reduction treatment, following the completion of noble metal recovery processes such as a gold extraction process.

Figure 7:
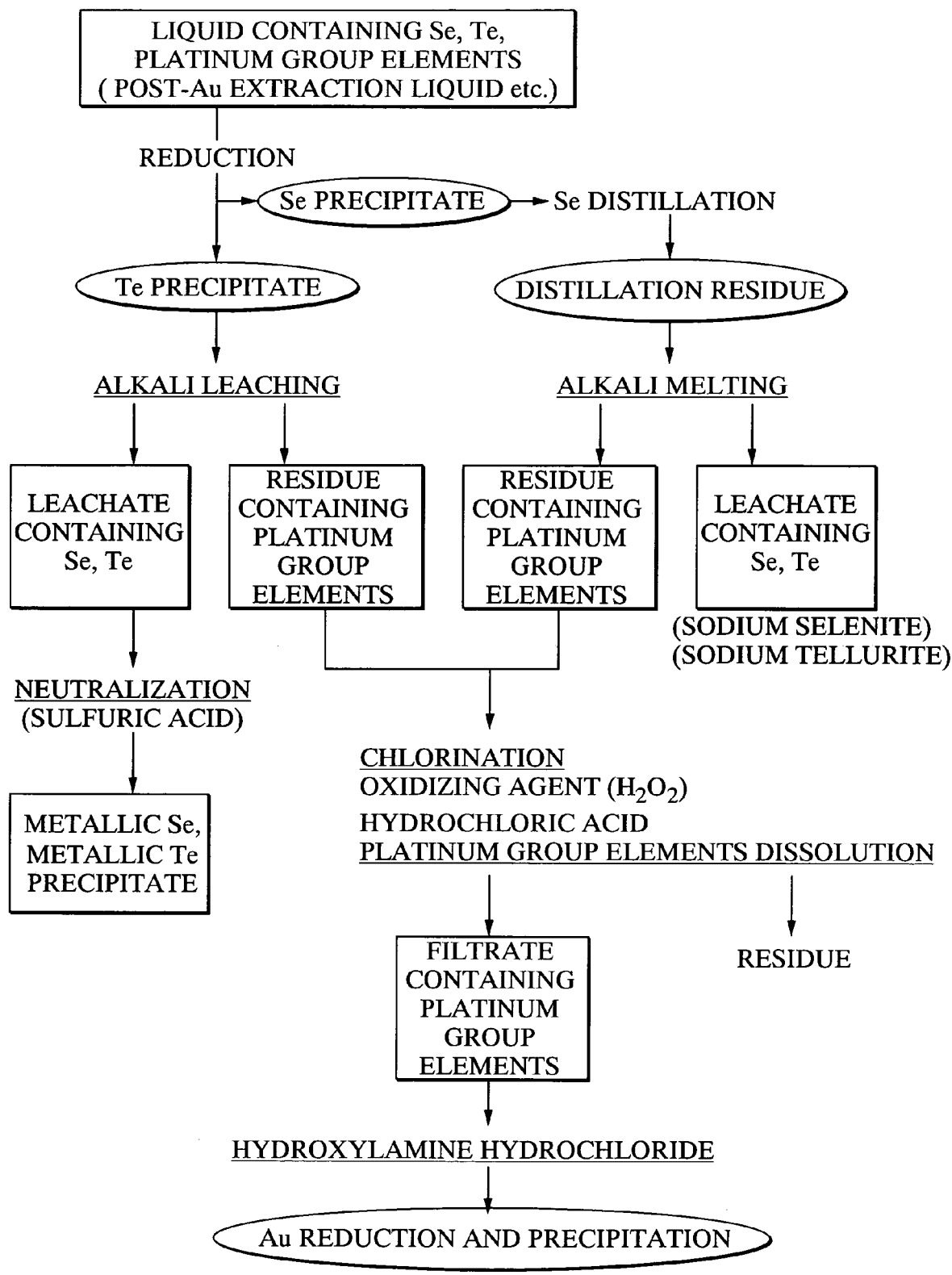
FIG. 7 is a process drawing showing an outline of a separation process of the present invention, showing steps for separating residual gold from a solution containing platinum group elements.

As follows is a description of a fifth preferred separation process of the present invention, using FIG. 7. As shown in FIG. 7, the fifth separation process is a treatment process for separating gold from a solution containing platinum group elements, wherein a material containing selenium/tellurium and platinum group elements is subjected to alkali treatment to effect a separation into a leachate containing selenium/tellurium and a residue containing platinum group elements, hydrochloric acid is added to this residue containing the platinum group elements in the presence of an oxidizing agent, a solid-liquid separation is conducted, and hydroxylamine hydrochloride is then added to the filtered solution containing the platinum group elements to selectively reduce and precipitate gold.

Even in this fifth separation process of the present invention, a material containing selenium/tellurium and platinum group elements obtained in a copper smelting process can be used, in a similar manner to that described in the first separation process.

[Alkali Treatment]

The material containing selenium/tellurium and platinum group elements undergoes alkali treatment, and is separated into a leachate containing selenium/tellurium and a residue containing platinum group elements. As described above, this alkali treatment can involve either an alkali leaching process or an alkali melt process, or may include both processes. In those cases where both the alkali leaching process and the alkali melt process are carried out, the selenium that precipitates first on reduction of the aforementioned post-extraction liquid is preferably subjected to distillation to enable the recovery of high purity selenium, and the residue (distillation residue) is subjected to alkali melt treatment, whereas the tellurium that is precipitated afterwards is preferably subjected to alkali leaching treatment. The distillation residue includes compounds such as palladium selenide, and is stable, and consequently selenium dissolution cannot be achieved by alkali leaching. By subjecting the distillation residue to alkali melt treatment, the selenium can be processed efficiently. In contrast, the rhodium and ruthenium incorporated in the tellurium precipitate is of a relatively higher content than that contained in the selenium precipitate, and consequently if the tellurium precipitate is subjected to alkali melting, it is prone to forming insoluble oxides, making the subsequent hydrochloric acid leaching step difficult. Accordingly, the tellurium precipitate preferably undergoes alkali leaching treatment.

[Alkali Melting]

In the alkali leaching treatment, the selenium precipitate obtained by reduction treatment of the material containing selenium/tellurium and platinum group elements, or the residue obtained from distillation treatment of this reduced selenium precipitate is combined with a flux comprising a mixture of caustic soda (NaOH) and sodium nitrate ($NaNO_3$), and the resulting mixture is melted by heating to a temperature exceeding the melting point (eutectic temperature) of the flux. This heating and melting converts the selenium to a mainly tetravalent state, generating sodium selenite ($Na_2SeO_3$) which subsequently dissolves. This alkali melt treatment causes the selenium/tellurium to dissolve, and water leaching is then used to separate the mixture into a leachate containing the selenium/tellurium, and a leaching residue containing the platinum group elements. This leachate can be added to the alkali leaching process of materials containing selenium/tellurium and platinum group elements, and subjected to alkali leaching, as described above. Using the leachate obtained from this alkali melt process enables the overall selenium/tellurium recovery rate for the entire treatment process to be improved.

[Alkali Leaching]

Alkali leaching treatment of the material containing selenium/tellurium and platinum group elements is typically conducted under an alkali concentration of at least 1 mol/L, and concentrations within a range from 5 mol/L to 8 mol/L are preferred. By ensuring that the alkali concentration is at least 1 mol/L, a strong alkali environment of at least pH 14 is achieved, which causes a reduction in the oxidation-reduction potential of selenium and tellurium, meaning selenium and tellurium can be dissolved into the alkali solution at normal pressure, without the need to use an oxidizing agent. Because the progress of this selenium and tellurium dissolution reaction is slow at room temperature, the leaching is typically conducted at a temperature of at least 60° C., and preferably at a temperature of approximately 80° C.

The alkali leaching causes the selenium and tellurium to be dissolved into the alkali solution, where they are dispersed in colloid form. In contrast, platinum group elements such as rhodium and palladium are not dissolved and remain in the solid phase. Filtering the resulting mixture enables a separation into a leachate containing selenium and/or tellurium, and a solid fraction containing the platinum group elements.

In the process of the present invention, hydroxylamine hydrochloride is added to the solution containing the platinum group elements obtained in the alkali treatment described above to selectively reduce and precipitate gold. Provided hydroxylamine hydrochloride is used as the reducing agent, gold can be selectively reduced and precipitated out, even if the platinum group element solution is hydrochloric acidic. The quantity of hydroxylamine hydrochloride added is typically within a range from 1.3 to 1.6 equivalents relative to the quantity of gold. If this quantity is less than 1.3 equivalents, then the reduction of the gold is unsatisfactory, whereas if the quantity exceeds 1.6 equivalents, then the platinum group elements, and particularly palladium, are reduced together with the gold, meaning the gold cannot be selectively recovered. The reduction temperature is preferably at least 60° C. At temperatures less than 60° C., the reduction reaction is slow, making the process industrially unsuitable.

Hence, according to this separation process of the present invention, residual gold contained in a platinum group element solution obtained by treating a material containing selenium/tellurium and platinum group elements can be precipitated and separated with a high level of efficiency. Accordingly, the separation process of the present invention is ideal for use in a process for recovering noble metals from a copper electrolysis slime, and is used for removing gold during the step for separating and recovering selenium/tellurium and platinum group elements from the reduction precipitate generated during reduction of a post-gold extraction liquid.

Figure 8A:
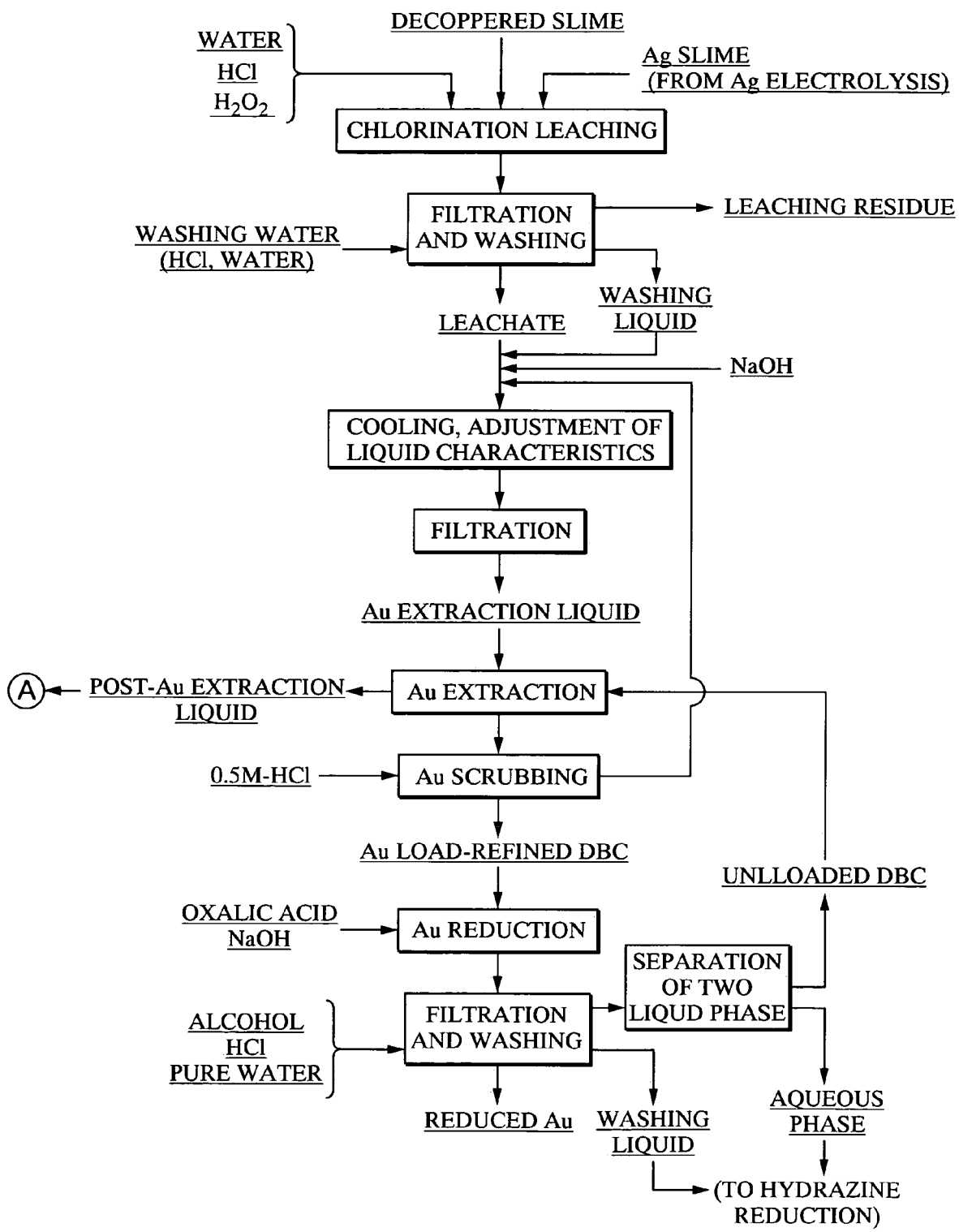
FIG. 8A, FIG. 8B and FIG. 8C are process drawings showing outlines of separation processes of the present invention, showing the steps of a preferred combination of separation processes of the present invention.
Figure 8B:
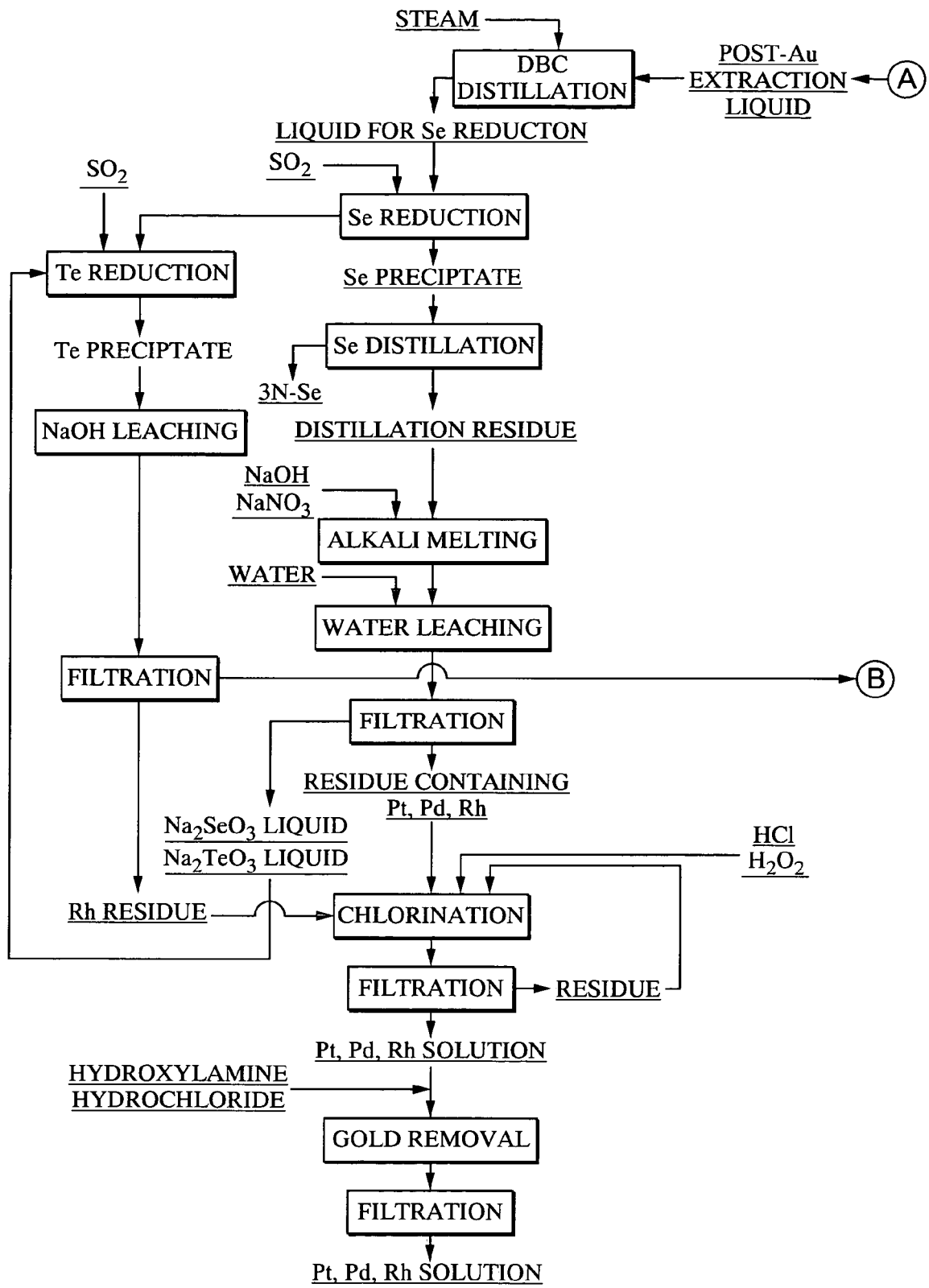
Figure 8C:
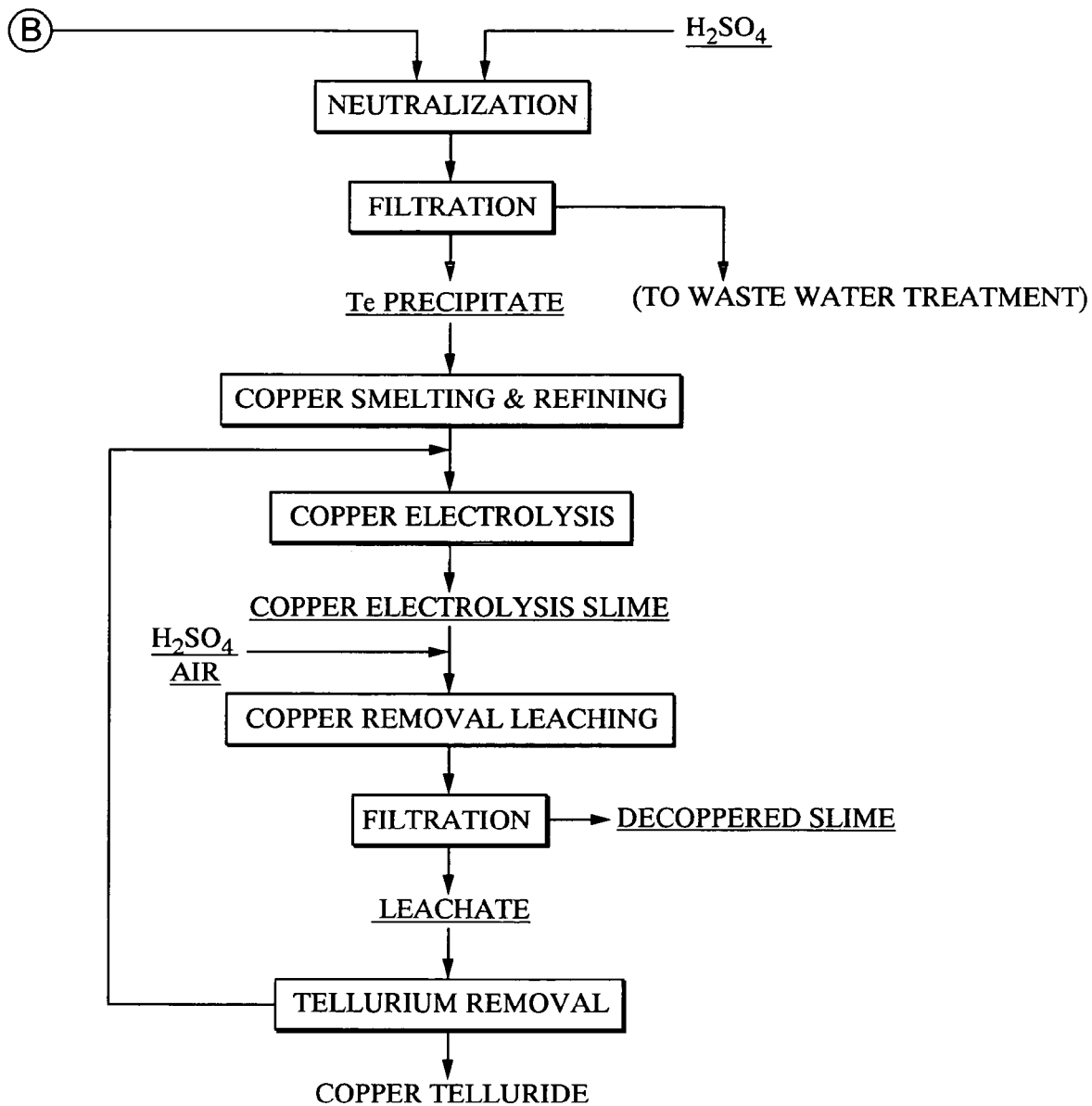

FIG. 8A, FIG. 8B and FIG. 8C are process drawings showing outlines of the separation processes of the present invention, showing the steps within a preferred combination of the first through fifth separation processes of the present invention.

As shown in FIG. 8, it is evident that by combining the preferred separation processes described above, selenium, tellurium, platinum group elements, and gold and the like can be easily separated from a decoppered slime, and more particularly from a material containing selenium/tellurium and platinum group elements that has been separated from a decoppered slime.

Specifically, the first separation process corresponds substantially to the steps in FIG. 8B from NaOH melting through to water leaching and filtration, and the second separation process corresponds substantially to the steps from NaOH elution through to filtration. Furthermore, the steps from NaOH elution through to filtration, and the steps from NaOH melting through to water leaching and filtration also correspond substantially to the third separation process. The fourth separation process corresponds to the steps from copper smelting through to tellurium removal in FIG. 8C. The fifth separation process corresponds substantially to the steps in FIG. 8B from NaOH leaching through to filtration, and the steps for subjecting the leachate containing selenium/tellurium, obtained in the steps from NaOH melting through to water leaching and filtration, to chlorination, filtration, and subsequent gold removal and filtration.

As follows, a series of examples and comparative examples of the present invention are described. Unless stated otherwise, the units % refer to % by weight (wt %) values.

EXAMPLE 1

Using 20 g of a platinum group element-containing material, comprising palladium selenide as the primary component, as a raw material, 21.7 g of caustic soda and 11.5 g of sodium nitrate were mixed with the raw material, and the mixture was heated for 2 hours at 400° C., forming a melt. Following cooling of the melt, 500 ml of water was added, and the mixture was stirred for one hour and then filtered. 97.4% of the selenium from the above raw material had been leached into the filtrate. Furthermore, platinum and palladium were not detected in the filtrate. The quantity of hexavalent selenium in the filtrate was less than 10%. Meanwhile, the filtered residue was repulped with 3N hydrochloric acid, and was then oxidized with hydrogen peroxide. As a result, 95% of the palladium and 99% or greater of the platinum were leached into the solution.

EXAMPLE 2

With the exception of using 20.3 g of caustic soda and 14.4 g of sodium nitrate, the same method as the example 1 was used to heat and melt 20 g of the platinum group element-containing material comprising palladium selenide as the primary component, and then subject this melt to water leaching and filtering. The leaching rate of selenium into the filtrate was 98.2%. Platinum and palladium were not detected in the filtrate. Furthermore, the proportion of hexavalent selenium in the filtrate was less than 10%. Meanwhile, when the filtered residue was repulped with 3N hydrochloric acid, and then oxidized with hydrogen peroxide, the leaching rate of palladium into the solution was 95%, and the leaching rate for platinum was 99% or greater.

EXAMPLE 3

With the exception of using 23.0 g of caustic soda and 8.6 g of sodium nitrate, the same method as the example 1 was used to heat and melt 20 g of the platinum group element-containing material comprising palladium selenide as the primary component, and then subject this melt to water leaching and filtering. The leaching rate of selenium into the filtrate was 97.2%. Platinum and palladium were not detected in the filtrate. Furthermore, the proportion of hexavalent selenium in the filtrate was less than 10%. Meanwhile, when the filtered precipitate was repulped with 3N hydrochloric acid, and then oxidized with hydrogen peroxide, the leaching rate of palladium into the solution was 95%, and the leaching rate for platinum was 99% or greater.

EXAMPLE 4

Following repulping of 5 kg of decoppered electrolysis slime in 5 L of hydrochloric acid and 2 L of water, hydrogen peroxide was added gradually to the mixture, and the temperature of the liquid was maintained at 70° C. to effect oxidizing leaching. Following cooling, the chlorination leaching residue was filtered, the acid concentration of the filtrate was adjusted, and the filtrate was mixed with 1.5 L of dibutyl carbitol, thus extracting the gold into the dibutyl carbitol. The respective concentration levels within the post-extraction liquid were 30 mg/L for gold, 58.9 g/L for selenium, 15 mg/L for platinum, and 172 mg/L for palladium. Sulfur dioxide gas was bubbled through this liquid to reduce the selenium at a liquid temperature of 80° C., and following cooling, the liquid was filtered. 901 g of this selenium precipitate was distilled in the atmosphere at 750° C. to separate the selenium, and when the 6.9 g of distillation residue was recovered and assayed, it was found to contain 45.2% of palladium, 4.2% of platinum, 15.3% of gold, and 34.2% of selenium. 5.7 g of caustic soda and 3.0 g of sodium nitrate were added to this distillation residue, and the same method as the example 1 was then used to heat and melt the mixture, and then subject this melt to water leaching and filtering. The leaching rate of selenium into the filtrate was 98.4%. Platinum and palladium were not detected in the filtrate. Furthermore, the proportion of hexavalent selenium in the filtrate was less than 10%. Meanwhile, when the filtered precipitate was repulped with 3N hydrochloric acid, and then oxidized with hydrogen peroxide, the leaching rate of palladium into the solution was 95%, and the leaching rate for platinum was 99% or greater.

COMPARATIVE EXAMPLE 1

With the exception of replacing the mixture of caustic soda and sodium nitrate with 27 g of only caustic soda, the same method as the example 1 was used to heat and melt the platinum group element-containing material comprising palladium selenide as the primary component, and then subject this melt to water leaching and filtering. The leaching rate of selenium into the filtrate was 33.6%, much lower than the value observed in the example 1. Platinum and palladium were not detected in the filtrate. Furthermore, the quantity of hexavalent selenium in the filtrate was less than 10%. Meanwhile, when the filtered residue was repulped with 3N hydrochloric acid, and then oxidized with hydrogen peroxide, the leaching rate of palladium into the solution was 95%, and the leaching rate for platinum was 99% or greater.

COMPARATIVE EXAMPLE 2

With the exception of replacing the mixture of caustic soda and sodium nitrate with 57.6 g of only sodium nitrate, the same method as the example 1 was used to heat and melt the platinum group element-containing material comprising palladium selenide as the primary component, and then subject this melt to water leaching and filtering. The leaching rate of selenium into the filtrate was 98.5%. Platinum and palladium were not detected in the filtrate. However, the quantity of hexavalent selenium in the filtrate was 25%, much higher than the value observed in the example 1. Meanwhile, when the filtered residue was repulped with 3N hydrochloric acid, and then oxidized with hydrogen peroxide, the leaching rate of palladium into the solution was 95%, and the leaching rate for platinum was 99% or greater.

EXAMPLE 5

When 1 kg of a material containing selenium and platinum group elements (Se: 65%, Te: 30%, Pd: 5%, Pt: 0.5%, Rh: 0.2%, and Ru: 0.4%) was mixed with 10 L of a 5 mol/L caustic soda solution, and then heated to 80° C. and held at that temperature for 1 hour, the majority of the material dissolved, yielding a dark purple colored liquid. The liquid was cooled and filtered, and 65 g of residue was recovered. Analysis of this residue revealed the platinum group elements Pd, Pt, Rh and Ru as the primary components, and the assay results were Pd: 80%, Pt: 8%, Rh: 3%, and Ru: 6%. The filtrate was a solution containing Se: 65 g/L and Te: 30 g/L, although no platinum group elements were detected.

EXAMPLE 6

When 1 kg of a material containing selenium and platinum group elements (Se: 65%, Te: 30%, Pd: 5%, Pt: 0.5%, Rh: 0.2%, and Ru: 0.4%) was mixed with 10 L of a 5 mol/L caustic soda solution, and then heated to 80° C. and held at that temperature for 1 hour, the majority of the material dissolved, yielding a dark purple colored liquid. The liquid was cooled and filtered, and 65 g of residue was recovered. The filtrate was a solution containing Se: 65 g/L and Te: 30 g/L, although no platinum group elements were detected. Analysis of the residue revealed the platinum group elements Pd, Pt, Rh and Ru as the primary components, and the assay results were Pd: 80%, Pt: 8%, Rh: 3%, Ru: 6%. This residue was repulped in 400 ml of hydrochloric acid and 100 ml of water, and with the liquid temperature held at 70° C., 120 ml of hydrogen peroxide was added gradually. Following completion of the hydrogen peroxide addition, the liquid was cooled and filtered, and when the filtrate was analyzed, it was found to contain Pd: 74 g/L, Pt: 7 g/L, Rh: 2.8 g/L, and Ru: 5.5 g/L.

EXAMPLE 7

With the exceptions of altering the concentration of the caustic soda solution to 1 mol/L, and extending the heating retention time to 5 hours, alkali leaching was conducted in the same manner as the example 5. As a result, 75 g of residue was recovered. The primary components within the residue were Pd, Pt, Rh and Ru, and the assay results were Pd: 67%, Pt: 7%, Rh: 3%, and Ru: 5%. The filtrate was a solution containing Se: 63 g/L and Te: 28 g/L, although no platinum group elements were detected.

EXAMPLE 8

With the exceptions of altering the concentration of the caustic soda solution to 8 mol/L, and setting the heating temperature to 60° C., alkali leaching was conducted in the same manner as the example 5. As a result, 65 g of residue was recovered. The primary components within the residue were Pd, Pt, Rh and Ru, and the assay results were Pd: 77%, Pt: 8%, Rh: 3%, and Ru: 6%. The filtrate was a solution containing Se: 64 g/L and Te: 29 g/L, although no platinum group elements were detected.

COMPARATIVE EXAMPLES 3 AND 4

With the exception of altering the concentration of the caustic soda solution to 0.5 mol/L, alkali leaching was conducted in the same manner as the example 5, but the selenium and tellurium did not dissolve, and the platinum group elements could not be separated from the selenium and tellurium (comparative example 3).

Furthermore, with the exception of setting the reaction temperature to room temperature, alkali leaching was conducted in the same manner as the example 5, but the selenium and tellurium did not dissolve, and the platinum group elements could not be separated from the selenium and tellurium (comparative example 4).

EXAMPLE 9

600 g of a distillation residue (selenium precipitate distillation residue; primary component: palladium selenide) of a reduction precipitate obtained by reduction treatment of the post-gold extraction liquid from a copper electrolysis slime was mixed with 651 g of caustic soda and 345 g of sodium nitrate, and then allowed to react for 2 hours at 400° C. Following cooling, 15 L of water was added to the crucible, and the resulting mixture was then stirred for 1 hour and filtered, yielding 15 L of filtrate and 348 g of a filtered residue. The concentration of Se in the filtrate was 10.4 g/L, indicating a leaching rate of 97.4% for the selenium from the distillation residue. Platinum and palladium were not detected in the leachate. Furthermore, the proportion of hexavalent selenium in the liquid was less than 10%. Analysis of the composition of the filtered residue revealed platinum group elements as the primary components, and the respective concentration levels were Pd 44%, Pt 5%, Rh 0.3%, and Ru 1.0%.

Next, when 1 kg of the tellurium precipitate (Se 65%, Te 30%, Pd 5%, Pt 0.5%, Rh 0.2%, Ru 0.4%) from the above reduction precipitate was mixed with 10 L of a caustic soda solution (concentration 5 mol/L), and then held at 80° C. for 1 hour, the solution turned a dark purple color. The liquid was then cooled and filtered, yielding 10 L of filtrate and 65 g of filtered residue. Analysis of the composition of the filtered precipitate revealed platinum group elements as the primary components, and the respective concentration values were Pd 80%, Pt 8%, Rh 3%, and Ru 6%. The Se concentration in the filtrate was 65 g/L and the Te concentration was 30 g/L, although no platinum group elements were detected.

Next, the filtered residue was mixed, 3N hydrochloric acid was added and the mixture was repulped, and then hydrogen peroxide was introduced at 70° C. to effect oxidation. The resulting mixture was filtered, and the concentration levels of the platinum group elements within the resulting hydrochloric acidic solution (filtrate) were Pd 95 g/L (95%), Pt 8.5 g/L (99%), Rh 3.2 g/L (95%), and Ru 0.5 g/L (at least 95%) (wherein the values in parentheses are leaching rates).

EXAMPLE 10

With the exception of using 609 g of caustic soda and 432 g of sodium nitrate, the same method as the example 9 was used to subject 600 g of a selenium distillation residue to heating and alkali melting, and the resulting melt was subsequently subjected to water leaching and then filtering. The leaching rate of selenium into the filtrate was 98.2%. Platinum and palladium were not detected in the filtrate. Furthermore, the proportion of hexavalent selenium in the filtrate was less than 10%. Analysis of the composition of the filtered residue revealed platinum group elements as the primary components, and the respective concentration were Pd 45%, Pt 5%, Rh 1%, and Ru 2%.

Next, when 1 kg of the tellurium precipitate from the above reduction precipitate was mixed with 10 L of a caustic soda solution (concentration 5 mol/L), and then held at 80° C. for 1 hour, the solution turned a dark purple color. The liquid was then cooled and filtered, yielding 10 L of filtrate and 65 g of filtered residue. The Se concentration in the filtrate was 65 g/L and the Te concentration was 30 g/L, although no platinum group elements were detected. Analysis of the composition of the filtered precipitate revealed platinum group elements as the primary components, and the respective concentration values were Pd 80%, Pt 8%, Rh 3%, and Ru 6%.

Next, the filtered residue were mixed, 2 L of hydrochloric acid and 500 ml of water were added and the mixture was repulped. With the liquid temperature maintained at 70° C., 360 ml of hydrogen peroxide was added gradually to effect oxidation. Following completion of the hydrogen peroxide addition, the mixture was cooled and filtered. The concentration of the platinum group elements within the resulting filtrate were Pd 81 g/L, Pt 7 g/L, Rh 2.1 g/L, and Ru 2.4 g/L.

EXAMPLE 11

The leachate (filtrate) obtained in the alkali leaching of the example 9 was held at 80° C., and as the filtrate was neutralized by adding sulfuric acid, a black precipitate began to appear, until the liquid become transparent at around pH 7.

The precipitate was filtered off and recovered, and analysis of the composition revealed 68% metallic selenium and 31% metallic tellurium.

EXAMPLE 12

With the exception of using hydrochloric acid instead of sulfuric acid, the example 11 was repeated, and a similar assay of metallic selenium and metallic tellurium was obtained.

COMPARATIVE EXAMPLE 5

1 kg of a tellurium precipitate was mixed with 1085 g of caustic soda and 575 g of sodium nitrate, and then allowed to react for 2 hours at 400° C., in the same manner as the selenium distillation residue of the example 9. Following cooling, 25 L of water was added to the crucible, and the resulting mixture was then stirred for 1 hour and filtered, and the concentrations within the filtrate indicated a leaching rate of 97.4 wt % for Se and 98.1% for Te. Platinum and palladium were not detected in the filtrate. The filtered residue was mixed, 3N hydrochloric acid was added and the mixture was repulped, and then hydrogen peroxide was introduced at 70° C. to effect oxidation. The resulting mixture was filtered, and the concentration levels and leaching rates of the platinum group elements within the resulting hydrochloric acidic solution (filtrate) were Pd 95 g/L (95%), Pt 8.5 g/L (95%), Rh 1.3 g/L (39%), and Ru 1.5 g/L (14%) (wherein the values in parentheses are leaching rates), indicating a significant decrease in the leaching rates for Rh and Ru in comparison with the example 9.

COMPARATIVE EXAMPLE 6

Instead of subjecting the selenium distillation residue from the example 9 to alkali melting, 1 kg of the same selenium distillation residue was combined with 10 L of 5 mol/L caustic soda solution and the temperature was maintained at 80° C., but the selenium underwent almost no dissolution.

EXAMPLE 13

When a material containing selenium/tellurium and platinum group elements (Se 65%, Te 30%, Pd 5%, Pt 0.5%, Rh 0.2%, and Ru 0.4%) comprising 1 kg of a selenium/tellurium reduction precipitate was mixed with 10 L of a 5 mol/L caustic soda solution and then held at 80° C. to conduct alkali leaching, the majority of the material dissolved, yielding a dark purple colored liquid. The liquid was cooled and filtered, and 65 g of residue was recovered. The filtrate contained Se: 65 g/L and Te: 30 g/L, although no platinum group elements were detected. With the temperature held at 80° C., sulfuric acid (50% concentration) was added, and when neutralization was continued to pH 7, a black colored powder precipitated. The composition of this precipitate was Se: 68.5%, Te: 31.5%. Furthermore, the concentrations of Se and Te left in the filtrate were 530 ppm and 210 ppm respectively. The precipitate was introduced into a copper smelting process, electrolytic refining was conducted, and the anode slime was leached into the sulfuric acidic electrolyte, with air bubbled through the electrolyte. The majority of the Te within the anode slime was dissolved, and the Te assay of the slime following leaching was 0.5%. Furthermore, because Se is not dissolved, no Se was detected in the leachate, and the Se assay of the slime following leaching was 8.3%. The leachate was passed through a column packed with copper chip, thus recovering the Te in the liquid as copper telluride. Furthermore, the residual Se and gold in the slime was dissolved by hydrochloric acid oxidizing leaching, and following solvent extraction of the gold, sulfur dioxide was introduced into the post-extraction liquid to reduce and recover the selenium. Analysis of the composition of the above alkali leaching residue revealed the platinum group elements Pd, Pt, Rh and Ru as the primary components, and the respective assay values were Pd 80%, Pt 8%, Rh 3%, and Ru 6%. This residue was repulped with 2 L of hydrochloric acid and 500 ml of water, and with the liquid temperature maintained at 70° C., 360 ml of hydrogen peroxide was added gradually. Following completion of the hydrogen peroxide addition, the mixture was cooled and filtered, and subsequent analysis of the resulting filtrate revealed concentration levels of Pd 81 g/L, Pt 7 g/L, Rh 2.1 g/L, and Ru 2.4 g/L.

EXAMPLE 14

600 g of a distillation residue (Se: 50%, Pd: 40%, Pt: 3%, Rh: 1%, and Ru: 2%) obtained by reducing the post-gold extraction liquid from a copper electrolysis slime and then performing distillation treatment was mixed with 651 g of caustic soda and 345 g of sodium nitrate, and then allowed to react for 2 hours at 400° C. to effect alkali melting. Following cooling, when 15 L of water was added to the mixture, and the resulting mixture was then stirred for 1 hour and then filtered, 97.4% of the selenium had been leached into the filtrate, whereas platinum and palladium were not detected. Furthermore, the proportion of hexavalent selenium in the liquid was less than 10%.

EXAMPLE 15

To 1 kg of a tellurium precipitate, obtained by introducing further sulfur dioxide gas into the liquid remaining following separation of the selenium precipitate in the example 14, was added 10 liters of a 5 mol/L caustic soda solution, and when alkali leaching was conducted with the temperature maintained at 80° C., the majority of the precipitate dissolved, and the solution turned a dark purple color. The liquid was then cooled and filtered, yielding a residue of 65 g. Analysis of the residue revealed the platinum group elements Pd, Pt, Rh and Ru as the primary components. This residue was repulped in 2 liters of hydrochloric acid and 500 ml of water, and with the liquid temperature held at 70° C., 360 ml of hydrogen peroxide was added gradually. Following completion of the hydrogen peroxide addition, the liquid was cooled and filtered. Analysis of the filtrate revealed Pd 81 g/L, Pt 7 g/L, Rh 2.1 g/L, Ru 2.4 g/L, and Au 3.8 g/L. 6.1 g of hydroxylamine hydrochloride was added to the solution as a reducing agent, and the mixture was reacted for 1 hour at 60° C. Following cooling, reanalysis of the noble metals in the solution revealed no changes in the dissolved quantities of Pd, Pt, Rh and Ru, but the quantity of dissolved gold had decreased to 0.05 g/L, indicating that Au had been selectively reduced.

COMPARATIVE EXAMPLE 7

When the example 15 was repeated and hydrazine was used as the reducing agent, the Pd and Pt was reduced together with Au, meaning Au could not be separated from the platinum group elements.

INDUSTRIAL APPLICABILITY

A separation process of the present invention enables metals including the platinum group elements Pt, Rh, Ir and Ru, as well as selenium, tellurium, gold, silver and copper and the like contained in, for example, the insoluble residue by-product that forms in the electrolyte during the copper electrolysis step of a copper smelting and refining process, to be separated and recovered simply, efficiently, and at low cost.

The invention claimed is:

1. A separation process for platinum group elements comprising:
   (A) treating a material comprising selenium and/or tellurium, and platinum group elements, with alkali,
   (B) leaching the selenium and/or tellurium, and
   (C) separating a leaching residue comprising the platinum group elements and a selenium and/or tellurium leachate,
   wherein in (A), a flux comprising a mixture of caustic soda and sodium nitrate is added to said material comprising the selenium and/or the tellurium, and the platinum group elements, to form a mixture, and the resulting mixture is melted by heating to a temperature ranging from 350°C. to 450°C.,
   in (B) the leaching of the selenium and/or the tellurium is conducted by leaching the selenium and/or the telerium from the melt with water, thereby forming a liquid fraction and a residue, and
   in (C) the separating comprises the liquid fraction comprising sodium selenite, and the residue comprising the platinum group elements.

2. The separation process according to claim 1, wherein a molar ratio between said caustic soda and said sodium nitrate ranges from from 75:25 to 85:15.

3. The separation process according to claim 1, wherein after C), hydrogen peroxide and hydrochloric acid are added to said residue comprising the platinum group elements to dissolve said platinum group elements.

4. The separation process according to claim 1, wherein said material comprising the selenium and or the tellurium, and the platinum group elements is an extraction residue process precipitate left after a solvent extraction has been used to separate gold from a hydrochloric acid leachate from a decoppered slime.

5. The separation process according to claim 1, wherein said material comprising the selenium and/or the tellurium, and the platinum group elements is a distillation residue produced by converting a decoppered slime to a slurry by adding hydrochloric acid and hydrogen peroxide, filtering said slurry to effect a separation into a leaching residue comprising primarily silver, and a leachate comprising gold, the platinum group elements the selenium and/or the tellurium, subsequently adjusting liquid characteristics of said leachate and then using a solvent extraction to separate the gold from said leachate, adding sulfur dioxide to a post-gold extraction liquid to sequentially reduce and precipitate out the selenium and then the tellurium, and then heating said precipitated material comprising the platinum group elements and selenium to concentrate the platinum group elements, while distilling and separating of selenium.

6. The separation process according to claim 1, wherein hydrochloric acid is added to said residue comprising the platinum group elements in the presence of an oxidizing agent, a solid-liquid separation is conducted, and hydroxylamine hydrochloride is then added to a resulting filtered platinum group element-containing solution to selectively reduce and precipitate gold.

7. A separation process for platinum group elements comprising:
   (A) treating a material comprising selenium and/or tellurium, and platinum group elements, with alkali,
   (B) leaching the selenium and/or tellurium, and
   (C) separating a leaching residue comprising a platinum group element and a selenium and/or tellurium leachate, wherein said (A) and said (B) are conducted simultaneously as an alkali leaching process,
   and
   wherein the material comprising the selenium and/or tellurium and the platinum group elements is leached with alkali at high temperature ranging from 60°C. to 80°C., causing the selenium and/or tellurium to migrate into an alkali liquid, and a solid-liquid separation is then conducted to separate a resulting mixture into a solid fraction comprising the platinum group elements, and a liquid fraction comprising the selenium and/or tellurium.

8. The separation process according to claim 7, wherein hydrochloric acid and an oxidizing agent are added to the solid fraction generated in said solid-liquid separation, thus dissolving said platinum group elements.

9. The separation process according to claim 7, wherein said material containing selenium and/or tellurium and the platinum group elements comprises both selenium and tellurium, and wherein the material containing selenium and tellurium is leached with alkali at the high temperature, causing the tellurium to migrate into said alkali liquid with the selenium, thus effecting a separation of said platinum group elements.

10. The separation process according to claim 7, wherein said material comprising the selenium and/or tellurium and the platinum group elements is leached using an alkali concentration of at least 1 mol/L.

11. The separation process according to claim 7, wherein hydrochloric acid and either hydrogen peroxide or chlorine gas are added to said solid fraction from said solid-liquid separation performed after said alkali leaching, thus dissolving said platinum group elements.

12. The separation process according to claim 7, wherein said platinum group elements comprise one or more of rhodium, ruthenium, palladium and platinum.

13. The separation process according to claim 7, wherein said material comprising the selenium and/or tellurium, and the platinum group elements is an extraction residue process precipitate left after a solvent extraction has been used to separate gold from a hydrochloric acid leachate from a decoppered slime.

14. The separation process according to claim 7, wherein said material comprising the selenium and/or tellurium, and the and platinum group elements is a filtered precipitate produced by converting a decoppered slime to a slurry by adding hydrochloric acid and hydrogen peroxide, filtering said slurry to effect a separation into a leaching residue comprising primarily silver, and a leachate comprising gold, the platinum group elements, the selenium and/or tellurium, subsequently adjusting liquid characteristics of said leachate and then using a solvent extraction to separate gold from said leachate, adding sulfur dioxide to a post-extraction liquid to precipitate the selenium and/or the tellurium, and then subjecting said precipitate to solid-liquid separation.

15. The separation process according to claim 7, comprising selenium and tellurium, wherein a selenium and tellurium mixture is obtained by adding sulfuric acid or hydrochloric acid to a selenium and tellurium leachate obtained in said alkali leaching process, thus neutralizing said leachate and precipitating said selenium and tellurium mixture, and said obtained selenium and tellurium mixture is then introduced into a copper refining process to generate an alloy of selenium and tellurium with copper, said alloy is subjected to copper electrolysis to recover electrolytic copper, while accumulating selenium and tellurium within a copper electrolysis slime, and said copper electrolysis slime is then subjected to sulfuric acid oxidizing leaching, thus dissolving and separating tellurium in a leachate from selenium in a leaching residue.

16. A separation process for platinum group elements comprising: (A) treating a material containing selenium and tellurium and platinum group elements with alkali, (B) leaching the selenium and the tellurium, and (C) separating a platinum group element-containing leaching residue and a selenium and tellurium leachate, the process further comprising an alkali melt process (i), comprising a step for adding a flux comprising a mixture of caustic soda and sodium nitrate to a residue from a distillation treatment of a material containing the selenium and the tellurium and the platinum group elements, and then heating to a temperature exceeding a melting (eutectic) temperature of said mixture, thus dissolving said selenium and tellurium, as said step (A) for conducting said alkali treatment, a step for conducting water leaching as said step (B) for leaching the selenium and the tellurium, and further comprising said step (C) for separating said platinum group element-containing leaching residue and said selenium and tellurium leachate, and an alkali leaching process (ii), comprising a step for leaching the material containing the selenium and the tellurium and platinum group elements with alkali at high temperature as said step (A) for conducting said alkali treatment and said step (B) for leaching selenium/tellurium, and further comprising said step (C) for separating said platinum group element-containing leaching residue and said selenium and tellurium leachate.

17. The separation process according to claim 16, wherein a solution containing selenium and tellurium and platinum group elements is subjected to a reduction treatment, and a residue generated by subjecting a portion of a resulting reduction precipitate to distillation treatment is then subjected to alkali melt treatment, while remaining reduction precipitate is subjected to alkali leaching treatment.

18. The separation process according to claim 16, wherein sulfur dioxide gas is introduced into a post-gold extraction liquid which is obtained by recovering noble metals from copper electrolysis slime to effect a reduction treatment, and a residue containing selenium which is precipitated first in the reduction treatment is distilled to separate selenium and is subjected to the alkali melt process (i), whereas a residue containing tellurium which is precipitated next in the reduction treatment is subjected to the alkali leaching process (ii).

19. The separation process according to claim 16, wherein a leachate obtained in said water leaching of said alkali melt process is recycled to said alkali leaching process, and subjected to alkali leaching together with the material containing the selenium and tellurium and platinum group elements.

20. The separation process according to claim 16, wherein the leachate obtained in said alkali leaching process is neutralized by adding sulfuric acid or hydrochloric acid, thus precipitating the selenium and the tellurium.

21. The separation process according to claim 16, wherein hydrochloric acid is added to the leaching residue generated in said alkali leaching process and said alkali melt process in presence of an oxidizing agent, thus dissolving said platinum group elements.

22. The separation process according to claim 16, wherein a selenium and tellurium mixture is obtained by adding a selenium and tellurium leachate obtained in said alkali melt process to a material containing selenium and tellurium and platinum group elements used in said alkali leaching process, subsequently conducting alkali leaching, and then adding sulfuric acid or hydrochloric acid to a resulting leachate to neutralize said leachate and precipitate said selenium and tellurium mixture, and said obtained selenium and tellurium mixture is then introduced into a copper smelting and refining process to generate an alloy of selenium and tellurium with copper, said alloy is subjected to copper electrolysis to recover electrolytic copper, while accumulating selenium and tellurium within a copper electrolysis slime, and said copper electrolysis slime is then subjected to sulfuric acid oxidizing leaching, thus dissolving and separating tellurium in a leachate from selenium in a leaching residue.

23. A separation process for platinum group elements comprising:
(A) treating a material comprising selenium and tellurium, and platinum group elements, with alkali,
(B) leaching the selenium and tellurium, and
(C) separating a leaching residue comprising the platinum group elements and a selenium and tellurium leachate, wherein
a selenium and tellurium mixture is obtained from said selenium and tellurium leachate, and said obtained selenium and tellurium mixture is then introduced into a copper smelting and refining process to generate an alloy of selenium and tellurium with copper, said alloy is subjected to copper electrolysis to recover electrolytic copper, while accumulating selenium and tellurium within a copper electrolysis slime, and said copper electrolysis slime is then subjected to sulfuric acid oxidizing leaching, thus dissolving and separating tellurium in a leachate from selenium in a leaching residue.

24. The separation process according to claim 23, wherein said material comprising the selenium, the tellurium, and the platinum group elements is a reduction precipitate produced by introducing sulfur dioxide gas into a post-gold extraction liquid and conducting a reduction treatment.

25. The separation process according to claim 23, wherein following a leaching of tellurium by sulfuric acid oxidizing leaching of said copper electrolysis slime, a resulting leachate is contacted with metallic copper, generating copper telluride which is subsequently recovered.

26. A separation process for platinum group elements comprising: (A) treating a material containing selenium and/or tellurium and platinum group elements with alkali, (B) leaching the selenium and/or tellurium, and (C) separating a platinum group element-containing leaching residue and a selenium and/or tellurium leachate,
wherein hydrochloric acid is added to the leaching residue comprising the platinum group elements in presence of an oxidizing agent, a solid-liquid separation is conducted, and hydroxylamine hydrochloride is then added to a resulting filtered platinum group element-containing solution to selectively reduce and precipitate gold.

27. The separation process according to claim 26, wherein a post-gold extraction liquid which is obtained by recovering noble metals from copper electrolysis slime is used as the material comprising the selenium, tellurium, and platinum group elements, and sulfur dioxide gas is introduced into said post-gold extraction liquid to effect a reduction treatment, and a residue containing selenium which is precipitated first in the reduction treatment is distilled to separate selenium, and is subjected to an alkali melt treatment to separate a residue containing platinum group elements, whereas a residue containing tellurium which is precipitated next by introducing further sulfur dioxide gas into said post-gold extraction liquid is subjected to alkali leaching treatment to separate a residue containing platinum group elements, and said residues containing platinum group elements are reused.

* * * * *

UNITED STATES PATENT AND TRADEMARK OFFICE
CERTIFICATE OF CORRECTION

| | | |
|---|---|---|
| PATENT NO. | : 7,479,262 B2 | Page 1 of 1 |
| APPLICATION NO. | : 10/506613 | |
| DATED | : January 20, 2009 | |
| INVENTOR(S) | : Okada et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1164 days.

Signed and Sealed this

Fifth Day of October, 2010

David J. Kappos
*Director of the United States Patent and Trademark Office*